US012736905B2

(12) United States Patent
Ichikawa

(10) Patent No.: US 12,736,905 B2
(45) Date of Patent: Sep. 15, 2026

(54) IMAGE FORMING DEVICE TRANSITIONING TO SLEEP STATE OR OFF-MODE STATE FROM STANDBY STATE

(71) Applicant: BROTHER KOGYO KABUSHIKI KAISHA, Nagoya (JP)

(72) Inventor: Kazuki Ichikawa, Gamagori (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/983,939

(22) Filed: Dec. 17, 2024

(65) Prior Publication Data

US 2025/0231512 A1 Jul. 17, 2025

(30) Foreign Application Priority Data

Jan. 12, 2024 (JP) ................................ 2024-003083

(51) Int. Cl.
*G03G 15/00* (2006.01)
*G06F 1/3234* (2019.01)
*H04N 1/00* (2006.01)

(52) U.S. Cl.
CPC ..... *G03G 15/5004* (2013.01); *G03G 15/5016* (2013.01); *G03G 15/80* (2013.01); *G06F 1/3284* (2013.01); *H04N 1/00896* (2013.01)

(58) Field of Classification Search
CPC ........... G03G 15/5004; G03G 15/5016; G03G 15/5075; G06F 1/325; G06F 1/3287; G06F 1/3284; H04N 1/00891; H04N 1/00896; Y02D 10/00
See application file for complete search history.

(56) References Cited

U.S. PATENT DOCUMENTS

| | | | | |
|---|---|---|---|---|
| 10,015,739 | B2 * | 7/2018 | Yoon | H04W 52/0209 |
| 11,067,932 | B2 | 7/2021 | Takatani et al. | |
| 2008/0279578 | A1 | 11/2008 | Monde | |
| 2013/0083338 | A1 | 4/2013 | Fahrenkrug et al. | |
| 2014/0108843 | A1 * | 4/2014 | Choho | G06F 1/3228 713/323 |
| 2015/0277466 | A1 | 10/2015 | Yokomizo | |
| 2016/0006895 | A1 * | 1/2016 | Hikichi | G06F 1/3293 358/1.13 |

FOREIGN PATENT DOCUMENTS

| | | | |
|---|---|---|---|
| JP | 4053225 | B2 | 12/2007 |
| JP | 2016-195298 | A | 11/2016 |

* cited by examiner

*Primary Examiner* — Carla J Therrien
(74) *Attorney, Agent, or Firm* — Scully, Scott, Murphy & Presser, P. C.

(57) ABSTRACT

In an image forming device, a controller transitions the image forming device to a sleep state from a standby state under a condition that a first duration elapses with the image forming device maintained in the standby state since a start of the standby state. The controller transitions the image forming device to an off-mode state from the standby state under a condition that a second duration elapses with the image forming device maintained in the standby state since the start of the standby state. The off-mode state is a state in which the image forming device consumes less power than in the sleep state. The controller individually sets the first duration and the second duration by storing the first duration and the second duration in the memory. Each of the first duration and the second duration is inputted via the user interface or the communication interface.

16 Claims, 17 Drawing Sheets

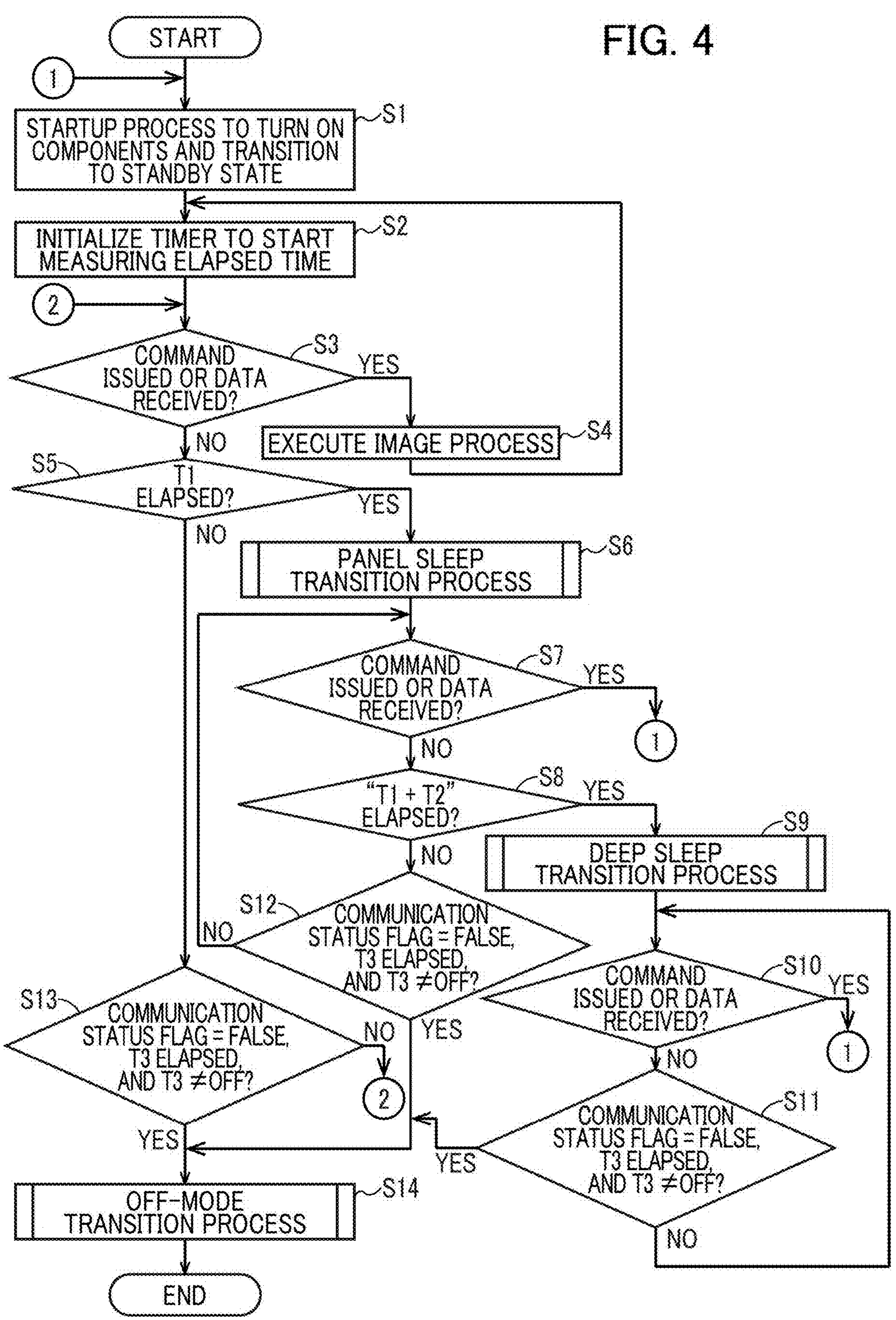
FIG. 4
START
1
STARTUP PROCESS TO TURN ON COMPONENTS AND TRANSITION TO STANDBY STATE
S1
INITIALIZE TIMER TO START MEASURING ELAPSED TIME
S2
2
COMMAND ISSUED OR DATA RECEIVED?
S3
YES
NO
EXECUTE IMAGE PROCESS
S4
S5
T1 ELAPSED?
YES
NO
PANEL SLEEP TRANSITION PROCESS
S6
COMMAND ISSUED OR DATA RECEIVED?
S7
YES
1
NO
"T1 + T2" ELAPSED?
S8
YES
DEEP SLEEP TRANSITION PROCESS
S9
NO
S12
NO
COMMUNICATION STATUS FLAG = FALSE, T3 ELAPSED, AND T3 ≠ OFF?
YES
COMMAND ISSUED OR DATA RECEIVED?
S10
YES
1
NO
S13
COMMUNICATION STATUS FLAG = FALSE, T3 ELAPSED, AND T3 ≠ OFF?
NO
2
YES
COMMUNICATION STATUS FLAG = FALSE, T3 ELAPSED, AND T3 ≠ OFF?
S11
YES
NO
OFF-MODE TRANSITION PROCESS
S14
END 38
103
7:00 PM 10.28.2024
101
102
FAX
Copy
Scan
104
105

38
Ecology
106
Sleep Time
107
Auto Power Off
108

38
Sleep Time
110
1_
1
2
3
4
6
7
9
0
111
SET T1 AND T1+T2 INDIVIDUALLY
SET VALUE IS LESS THAN OR EQUAL TO 20 min.
Cancel
OK
END SETTINGS
112
113
SET VALUES ARE GREATER THAN 20 min.

38
115
Changing this setting will increase power consumption.
116
Cancel
OK
117
118

38
103
101
7:00 PM 10.28.2024
102
FAX
Copy
Scan
104
105

38
Ecology
106
Sleep Time
107
Auto Power Off
108

38
Auto Power Off
120
Off
20min
1hour
2hour
4hour
8hour
121
SET T3
SET VALUE IS LESS THAN OR EQUAL TO 20 min.
Cancel
OK
END SETTINGS
122
123
SET VALUE IS GREATER THAN 20 min.

38
115
Changing this setting will increase power consumption.
116
Cancel
OK
117
118

150
152
******
Login
151

150
Setting
Sleep Time
Auto Power Off
...
156
157
155

150
Sleep Time
161
1_
minitue(s)
163
Cacel
Submit
162
160
SET T1 AND T1+T2 INDIVIDUALLY
SETTABLE VALUES ARE LESS THAN OR EQUAL TO 20 min.

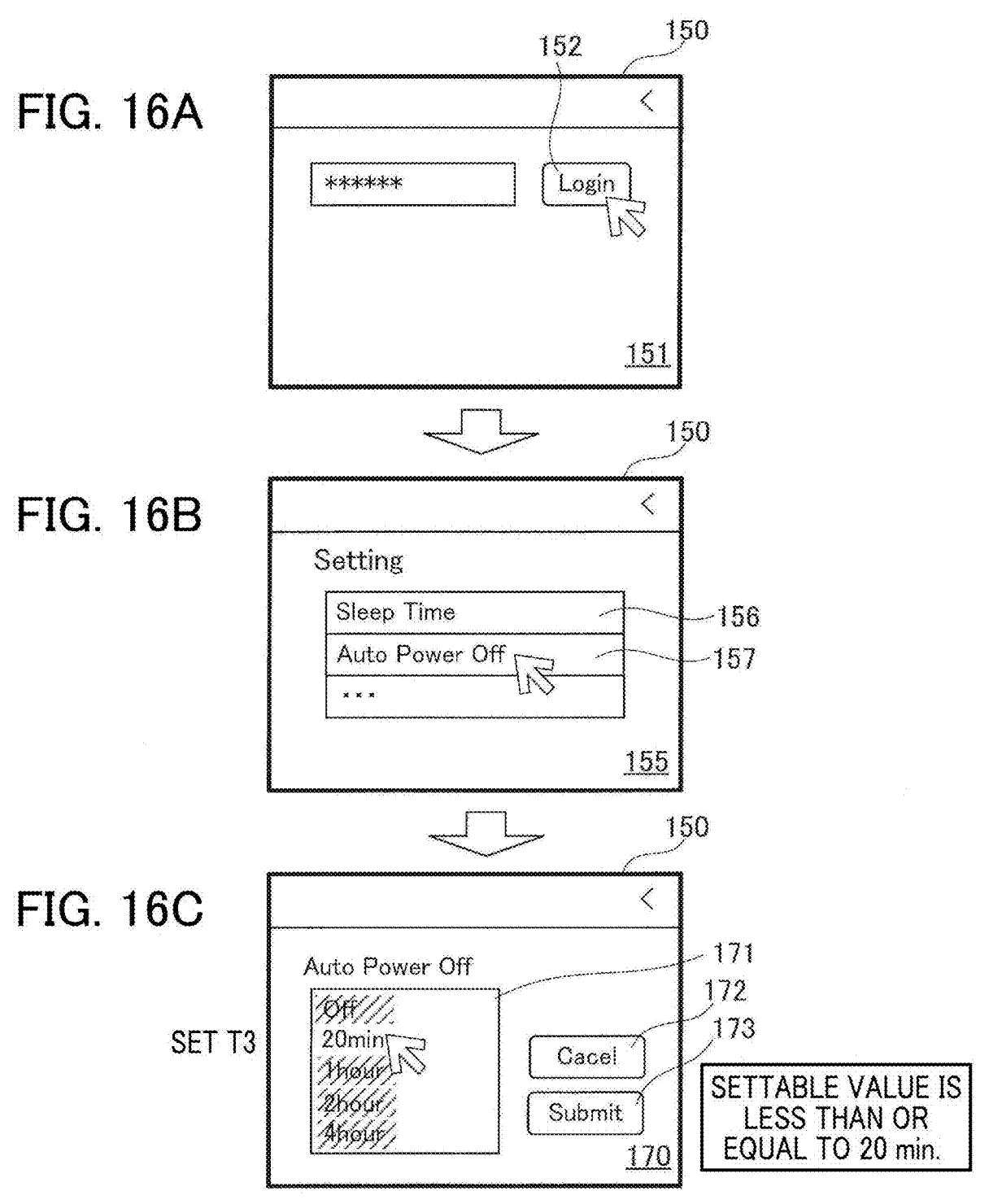

FIG. 16A 152
150
******
Login
151

FIG. 16B

150
Setting
Sleep Time
Auto Power Off
156
157
155

FIG. 16C

150
Auto Power Off
171
172
173
SET T3
Off
20min
1hour
2hour
4hour
Cacel
Submit
170
SETTABLE VALUE IS LESS THAN OR EQUAL TO 20 min.

IMAGE FORMING DEVICE TRANSITIONING TO SLEEP STATE OR OFF-MODE STATE FROM STANDBY STATE

REFERENCE TO RELATED APPLICATIONS

This application claims priority from Japanese Patent Application No. 2024-003083 filed on Jan. 12, 2024. The entire content of the priority application is incorporated herein by reference.

BACKGROUND ART

Conventionally, various means have been proposed to reduce power consumption in image forming devices designed to print images on objects such as sheets. Japanese patent No. 6409660 describes one such image forming device. When the primary power to the device is turned on, the device enters a standby state in which an operating power is supplied to an image forming member, image reading member, display member, operating member, modem unit, network communication unit, and the like. When a prescribed time T1 elapses after entering this standby state, during which time the image forming device receives no commands for executing image formation or image reading and no data related to image formation, the conventional device enters a sleep state that consumes less power than the standby state.

When the image forming device receives a command to execute image formation or image reading or data related to image formation while in this sleep state, the device returns to the standby state and subsequently enters an execution state for performing image formation or image reading. On the other hand, when an additional prescribed time T2 elapses after entering the sleep state, during which time the image forming device receives no execution commands for image formation or image reading and no data related to image formation, the image forming device enters an off-mode state that consumes even less power than the sleep state.

SUMMARY

Thus, in Patent Document described above, the time that elapses after the device enters the standby state until the device enters the off-mode state, which consumes the least amount of power, is the sum of the lengths of time T1 and T2. Therefore, in order to set the time between entering the standby state and entering the off-mode state to a desired length, each of the times T1 and T2 must be set individually so that the sum of their lengths is equivalent to the desired length.

In view of the foregoing, it is an object of the present disclosure to provide an image forming device that simplifies the process of setting the time to enter the off-mode state after transitioning to the standby state.

In view of the foregoing, it is an object of the present disclosure to provide an image forming device. The image forming device includes a user interface, a communication interface, a memory, and a controller. The controller is configured to perform: transitioning the image forming device to a sleep state from a standby state under a condition that a first duration elapses with the image forming device maintained in the standby state since a start of the standby state, the sleep state being a state in which the image forming device consumes less power than in the standby state; transitioning the image forming device to an off-mode state from the standby state under a condition that a second duration elapses with the image forming device maintained in the standby state since the start of the standby state, the off-mode state being a state in which the image forming device consumes less power than in the sleep state; and individually setting the first duration and the second duration by storing the first duration and the second duration in the memory, each of the first duration and the second duration being inputted via the user interface or the communication interface.

In the above structure, the image forming device transitions to the sleep state from the standby state. The image forming device in the standby state consumes less power than in the sleep state. The controller individually sets the first duration and the second duration. The first duration is a duration required to transition to the sleep state from the start of the standby state and the second duration is a duration required to transition to the off-mode state from the standby state. Accordingly, the state transition of the image forming device can be easily configured in accordance with a user's intention.

BRIEF DESCRIPTION OF DRAWINGS

FIG. 4 is a flowchart illustrating a main process.

FIGS. 16A-16C are explanatory diagrams illustrating operations with the terminal for setting duration for transition to the off-mode state.

DESCRIPTION

Figure 1:
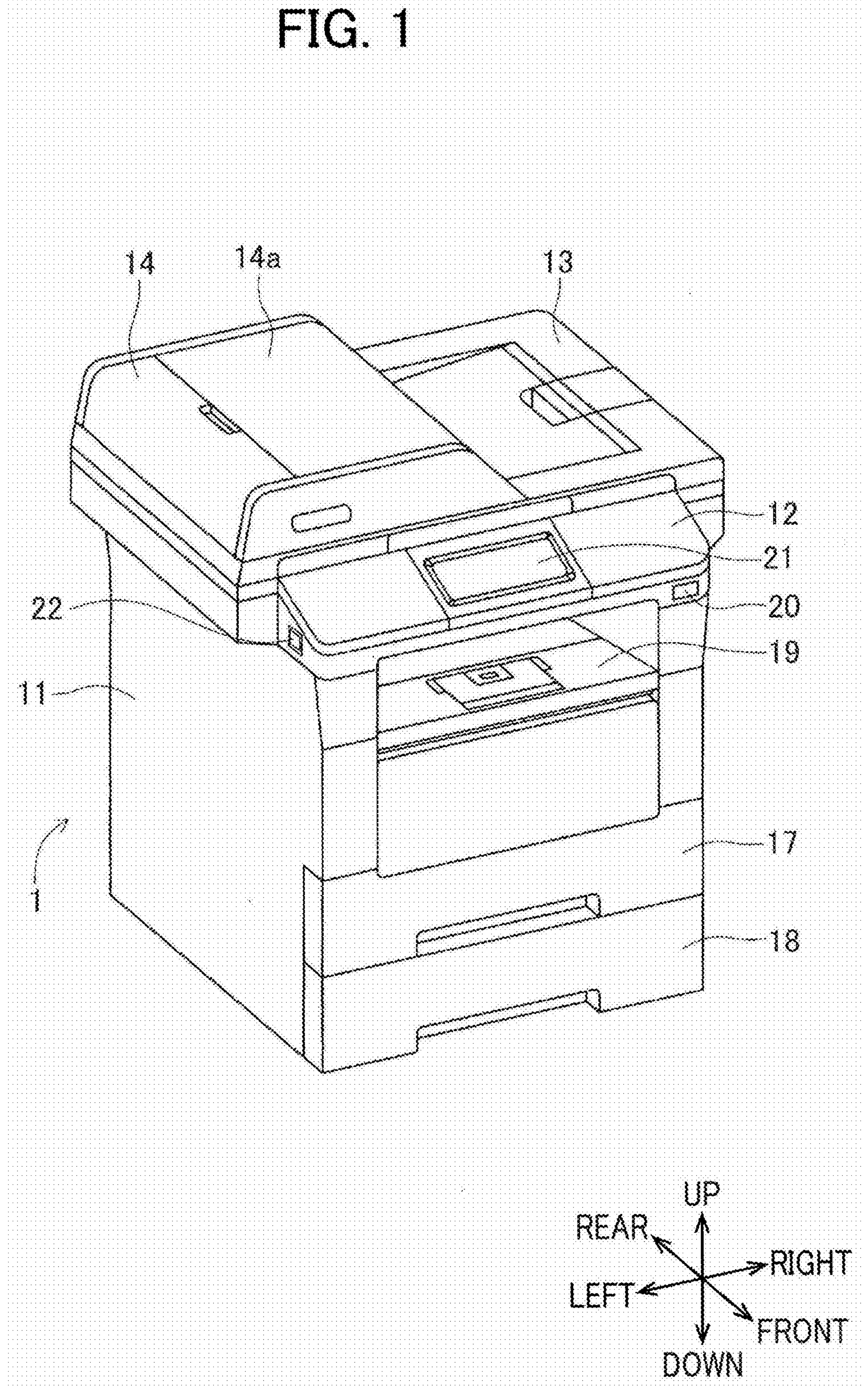
FIG. 1 is a perspective view schematically illustrating a configuration of a multifunction peripheral (MFP).

A multifunction peripheral (MFP) 1 will be described as an embodiment of an image forming device of the present disclosure while referring to the accompanied drawings. FIG. 1 is a perspective view illustrating an overview structure of the MFP 1.

Configuration of an MFP

The MFP 1 according to this embodiment is a multifunction peripheral provided with a print function, a copy function, a scan function, a fax transmission function, and a fax reception function. However, the MFP 1 may possess only some of these functions and need not be provided with all the functions. In the following description, directions will be based on the perspective of a user using the MFP 1. In other words, the near-right side in FIG. 1 will be the “front,” the far-left side the “rear,” the far-right side the “right,” the near-left side the “left,” the top side the “top,” and the bottom side the “bottom.”

As shown in FIG. 1, the MFP 1 is provided with a housing 11, a control panel 12, a document platen cover 13, an automatic document feeder (ADF) 14, sheet-feeding trays 17 and 18, a discharge tray 19, a USB receptacle 20, and the like. The housing 11 has a box-like shape. The document platen cover 13 is provided to cover the top of a document platen (not shown). The document platen cover 13 has a rotational shaft (not shown) on the rear side thereof so that the front side of the document platen cover 13 can rotate upward. Below the document platen, the MFP 1 is provided with an image sensor (not shown). An image scanner having the image sensor is moved relative to a document supported on the document platen to read the document.

The ADF 14 in this example is disposed in the top surface on the left side of the document platen cover 13. The ADF 14 has an ADF cover 14*a*, an image scanner (not shown), and the like. The ADF cover 14*a* has a rotational shaft (not shown) on the right edge thereof so that the left side of the ADF cover 14*a* can rotate upward. The ADF cover 14*a* can be placed in a closed position shown in FIG. 1 and an open position rotated upward from the closed position to an open position in which the ADP cover 14*a* slops slightly upward from the rotational axis thereof. In the open position, the ADF cover 14*a* supports a document on the top surface thereof. The ADF 14 feeds a document supported on the ADF cover 14*a* in the open position into an opening (not shown), moving the document relative to the image scanner so that the image scanner can read the document, and then discharges the document onto the top surface of the document platen cover 13.

The control panel 12 is disposed on the front side of the top surface of the housing 11. The control panel 12 has a touchscreen 21, physical operating buttons such as a numeric keypad (not shown), and the like. The USB receptacle 20 is also provided in the front surface of the control panel 12. The USB receptacle 20 is a female connector conforming to the USB standard. A USB memory device or USB cable can be connected to the USB receptacle 20. While not shown in the drawings, the control panel 12 may also have a built-in communication module for communicating with terminals (e.g., a smartphone) through near-field communication (NFC).

The sheet-feeding trays 17 and 18 are vertically juxtaposed in the bottom of the housing 11 and are removably mounted through the front surface of the housing 11. The discharge tray 19 is provided beneath the control panel 12 and is recessed inward from the front surface of the housing 11. Feeding members (not shown), an image-forming member (print engine) 35 (described later with reference to FIG. 2), and a discharge member (not shown) are also provided inside the housing 11. Sheets supported in the sheet-feeding tray 17 or 18 are conveyed to the image-forming member 35 by the respective feeding members. The image-forming member 35 forms images on the sheets. The discharge member discharges sheets into the discharge tray 19 after images are formed on the sheets. As an example, the sheet-feeding tray 17 may accommodate A4-size sheets while the sheet-feeding tray 18 accommodates B5-size sheets.

A power switch (power key) 22 is disposed on the housing 11 in a position accessible by the user. The power switch 22 switches the main power supply of the MFP 1 on and off. In addition to the function of switching the main power supply of the MFP 1 on and off, the power switch 22 in the present embodiment is operated to return the MFP 1 from an off-mode state described later.

Electrical Configuration of the MFP

Figure 2:
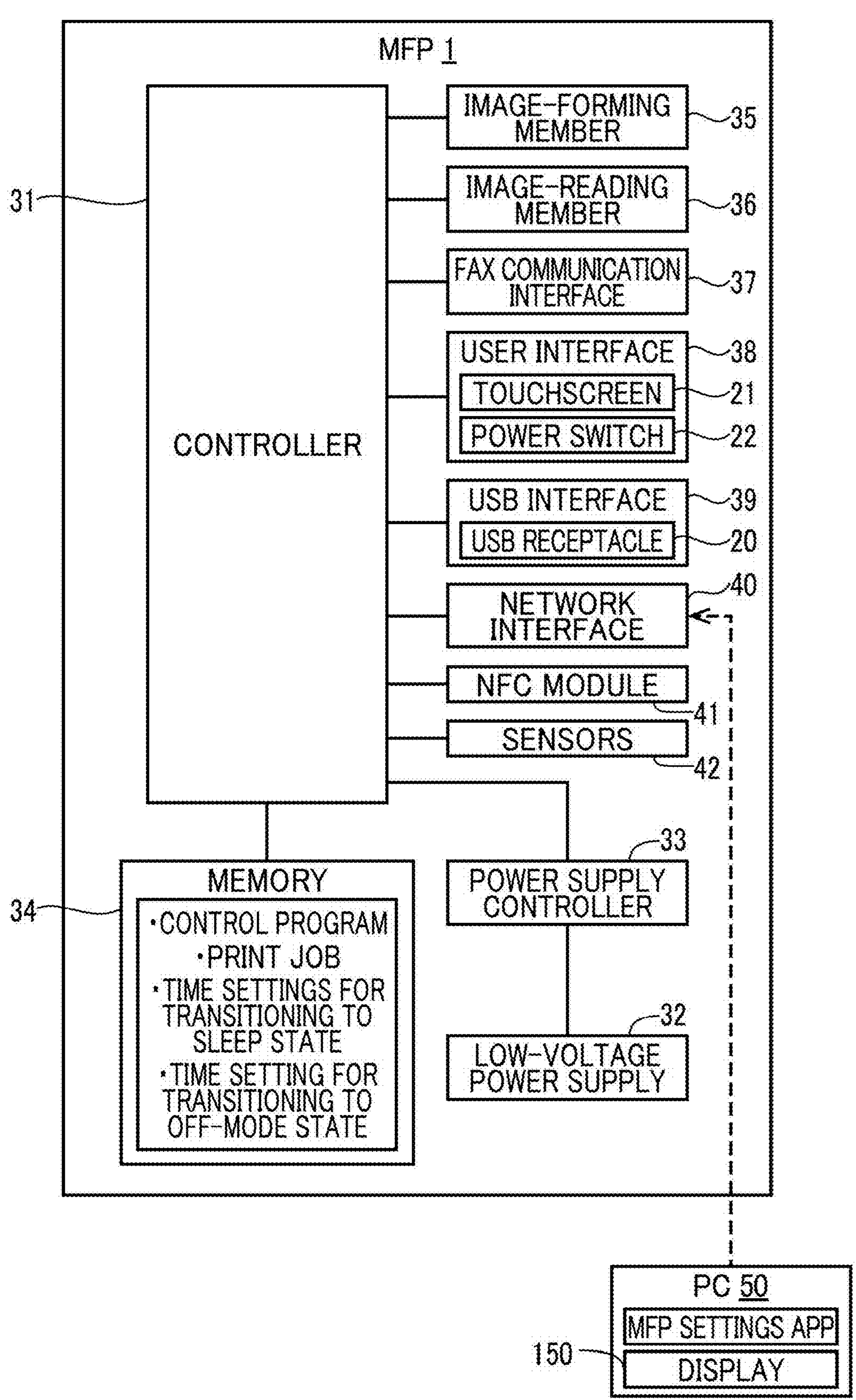
FIG. 2 is a block diagram illustrating an electrical configuration of the MFP.

Next, the electrical configuration of the MFP 1 will be described with reference to FIG. 2. In addition to the configuration shown in FIG. 1, the MFP 1 is provided with a controller 31, a low-voltage power supply 32, a power supply controller 33, a memory 34, an image-forming member 35, an image-reading member (scan engine) 36, a fax communication interface 37, a user interface 38, a USB interface 39, a network interface 40, a NFC module 41, and sensors 42 for detecting the opening and closing of various covers and the presence of sheets.

The controller 31 is configured of a central processing unit (CPU), an application-specific integrated circuit (ASIC), and the like. The controller 31 is electrically connected to the memory 34, image-forming member 35, image-reading member 36, fax communication interface 37, user interface 38, USB interface 39, network interface 40, NFC module 41, and sensors 42. The controller 31 executes programs stored in the memory 34 and controls the image-forming member 35, image-reading member 36, and the like based on signals inputted from the user interface 38 and network interface 40, for example. The controller 31 is also electrically connected to the low-voltage power supply 32 via the power supply controller 33.

The low-voltage power supply 32 generates operating voltages applied to the controller 31, as well as the memory 34, image-forming member 35, image-reading member 36, fax communication interface 37, user interface 38, USB interface 39, network interface 40, NFC module 41, sensors 42, and other components. In an operating state, the low-voltage power supply 32 receives a voltage (e.g., 100 V) applied from a commercial AC power supply and converts this voltage to prescribed operating voltages (e.g., 24 V). The low-voltage power supply 32 may supply an operating power directly to each component except the controller 31 without going through the controller 31 or may supply operating power via the controller 31.

The power supply controller 33 is a control unit for controlling the supply of operating power from the low-voltage power supply 32 to each component. In this embodiment, the power supply controller 33, together with the controller 31, is part of a controller system that controls the MFP 1. Hereinafter, the control system including the controller 31 and the power supply controller 33 is referred to as the “controller.” The power supply controller 33 may utilize a processor common to the controller 31 but is provided with a separate processor in this embodiment. In particular, the power supply controller 33 of this embodiment controls the application of operating voltages to components from the low-voltage power supply 32 according to state transitions of the MFP 1. This control will be described later in detail.

The memory 34 is embedded memory and may be configured of a combination of ROM, RAM, NVRAM, SSD, HDD, and the like. ROM, RAM, and NVRAM provided in the controller 31 or the power supply controller 33 and used when executing various programs may also be considered part of the memory 34.

The memory 34 is an example of a storage medium that can be read by a controller. Here, the controller indicates one or both of the controller 31 and the power supply controller 33. A controller-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The memory stores programs, such as a control program, executable by the controller. In the following description, actions such as "determine," "select," "calculate," "decide," "identify," "acquire," "receive," "control," and the like represent processes performed by the controller according to the descriptions of the programs. Note that the term "acquire" in this specification is used as a concept that does not necessarily require a request. In other words, a process by which the controller receives data without requesting that data is included in the concept of "the controller acquires data." The term "data" described herein is expressed as bit strings that can be read by the controller. Data of different formats are treated as the same data when the content of the data is essentially the same. The same holds true for "information" in this specification.

In addition to the above programs, the memory 34 stores print jobs received up to the current point in time, measured values of elapsed time (elapsed duration) since the MFP 1 transitioned to a standby state described later, a time setting for transitioning to a sleep state (for example, a time length for transitioning to the sleep state), a time setting for transitioning to an off-mode state (for example, a time length for transitioning to the off-mode state), and other information.

The image-forming member 35 uses the electrophotographic method to print color or monochrome images on sheets in accordance with print jobs, for example. While not shown in the drawings, the image-forming member 35 has four process cartridges corresponding to the four colors black, cyan, magenta, and yellow, an exposure member, transfer rollers, a fixing member, and the like. While not shown in the drawings, each process cartridge has a photosensitive drum, a developing roller, a toner-accommodating chamber, and the like. The exposure member forms electrostatic latent images on the surfaces of the photosensitive drums. The developing rollers supply toner to the electrostatic latent images to form toner images. The transfer rollers transfer the toner images onto sheets. The fixing member thermally fixes the toner images to the sheets.

The image-reading member 36 generates scan data by reading images of documents using the image scanner beneath the document platen or the image scanner possessed by the ADF 14.

The fax communication interface 37 includes a direct access arrangement (DAA) and a modem, for example. When connected to a telephone line (not shown), the fax communication interface 37 exchanges fax data with other fax communication devices via the telephone line.

The user interface 38 includes the touchscreen 21, which also functions as a display. The user interface 38 serves as a user interface between the user operating the MFP 1 and the controller, providing various information to the user and accepting user operations. The user interface 38 has a liquid crystal display on its surface. In this embodiment in particular, the user interface 38 is used to display a sleep setting screen, an off-mode setting screen, and the like described later and to set the duration until the MFP 1 transitions to the sleep state after entering the standby state and the duration until the MFP 1 transitions to the off-mode state after entering the standby state. Through the user interface 38, the user can use the touchscreen to select various options, buttons, icons, objects, and the like displayed on the liquid crystal display. However, the user interface 38 that accepts user operations may include physical keys and is not limited to a touchscreen. In other words, a liquid crystal display and physical keys may both be provided as the user interface 38. The user interface 38 also includes the power switch 22, which is operated to switch the main power supply of the MFP 1 on and off and to return the MFP 1 from the off-mode state.

In this embodiment, terms such as "options," "buttons," "icons," and "objects" are used for convenience to describe objects that are operated or selected by the user of the MFP 1 or the administrator managing the MFP 1, but other terms may be used in place of these.

The USB interface 39 reads data from and writes data to a USB-compliant storage medium connected to the USB receptacle 20 in accordance with the USB standard. The USB-compliant storage medium is a USB memory device, for example. Other external devices such as a PC or a smartphone can also be connected to the USB receptacle 20 via a USB cable. Further, the USB interface 39 can also supply power to a device connected to the USB receptacle 20 in addition to performing data transfers.

The network interface 40 connects the MFP 1 to a network through a wired or wireless connection. The types of networks to which the network interface 40 may connect include wired LAN, wireless LAN, and Wi-Fi (Japanese registered trademark) networks, for example. The MFP 1 can receive printing instructions (including the image data to be printed) from a PC 50, which is a terminal connected to the same network, via the network interface 40 and can print according to the received printing instructions. Conversely, the network interface 40 can also output scan data scanned by the image-reading member 36 to the PC 50 via the network.

Further, when an MFP settings app pre-installed on the PC 50 is started up, a settings screen is displayed on a display 150 of the PC 50, enabling the user to configure various settings related to the MFP 1 from the PC 50. In this embodiment in particular, the user can set the duration until the MFP 1 transitions to the sleep state after entering the standby state and the duration until the MFP 1 transitions to the off-mode state after entering the standby state. Information set through the MFP settings app is sent to the MFP 1 via the network.

The NFC module 41 is a communication module provided with an antenna for communicating with devices having a built-in NFC-compliant chip (e.g., smartphones). The NFC module 41 is built into the control panel 12 (see FIG. 1), for example. When an NFC-compliant device is brought near the NFC module 41, the NFC module 41 can establish communications with the device and can exchange data through wireless communication. By installing a special application on an NFC-compliant device in advance, the device can issue printing instructions to the MFP 1 via NFC.

The sensors 42 include a sensor that detects whether a document is present in the opening of the ADF 14, sensors that detect sheets in the sheet-feeding trays 17 and 18, a sensor that detects opening and closing of the document platen cover 13, and a sensor that detects opening and closing of the ADF cover 14*a*, for example. Each of these sensors outputs detection signals to the controller 31.

The print function of the MFP 1 enables the image-forming member 35 of the MFP 1 to print various data on sheets, including print jobs received from the PC 50 or another terminal via the network interface 40 or NFC module 41 and recording data read from a USB memory device via the USB interface 39. The copy function enables the image-reading member 36 of the MFP 1 to generate recording data and the image-forming member 35 to print the recording data on sheets, for example. The scan function enables the image-reading member 36 of the MFP 1 to generate scan data that the MFP 1 can transmit to the PC 50, for example, via the network interface 40 or write to a USB memory device or the like via the USB interface 39. The fax reception function enables the MFP 1 to print fax reception data received via the fax communication interface 37 on sheets with the image-forming member 35, to transmit the fax reception data to the PC 50, for example, via the network interface 40, or to write the fax reception data to a USB memory device or the like via the USB interface 39. The fax transmission function enables the MFP 1 to transmit various data via the fax communication interface 37, such as read data generated by the image-reading member 36, transmission data received from the PC 50 or another terminal via the network interface 40 or NFC module 41, and recording data read from a USB memory device or the like via the USB interface 39.

State Transitions

Figure 3:
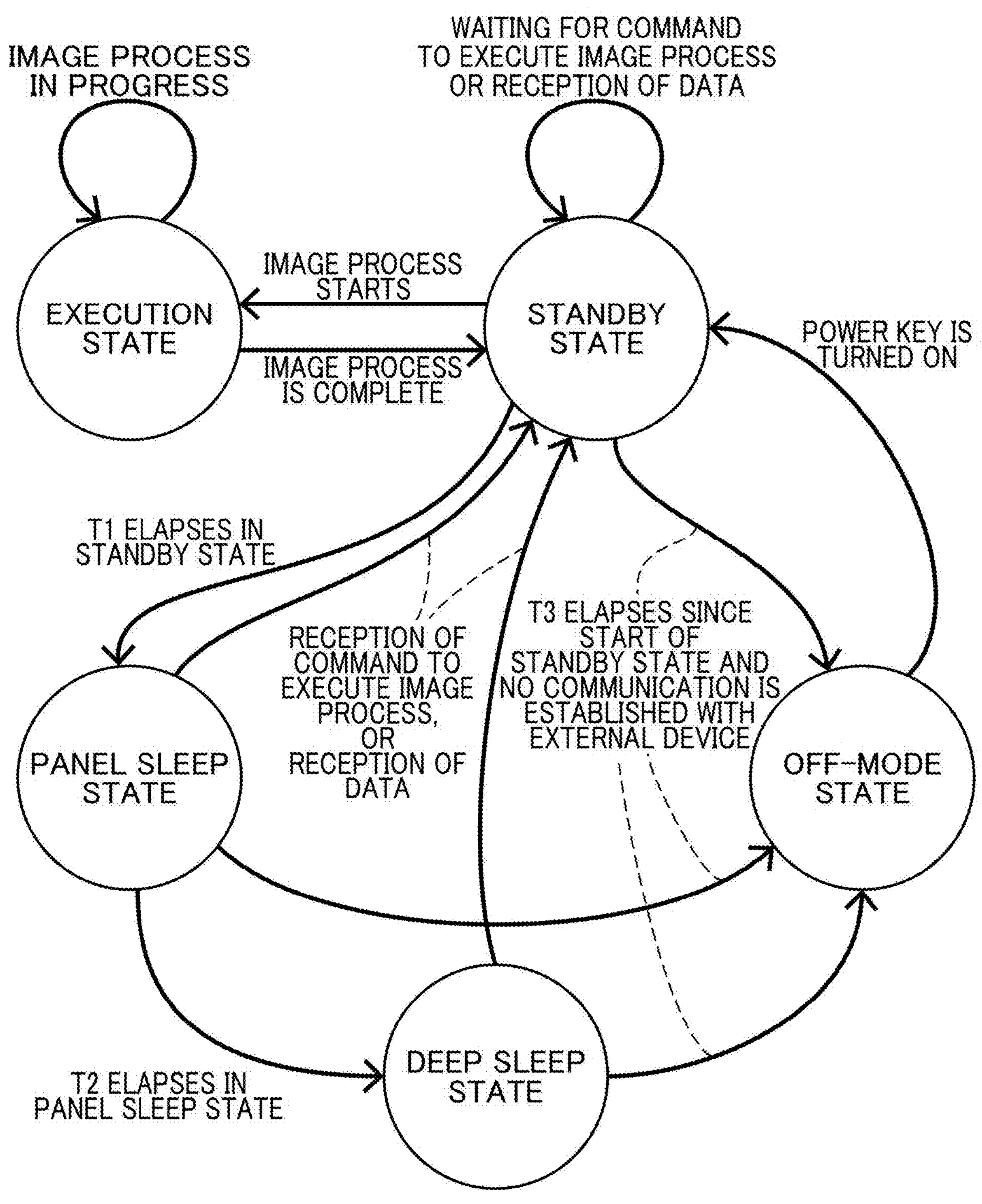
FIG. 3 is an explanatory diagram illustrating state transitions of the MFP.

Next, the various states to which the MFP 1 can transition will be described with reference to FIG. 3. As shown in FIG. 3, the power consumption state of the MFP 1 changes according to whether a command to execute image formation with the image-forming member 35 has been issued, whether a command to execute an image scan with the image-reading member 36 has been issued, whether the user interface 38 has been operated, whether communication has been established with an external device, and the like.

Beginning from a power-off state, when the power switch 22 is pressed (turned on), the power consumption state of the MFP 1 enters the "standby state." In the standby state, the low-voltage power supply 32 provided in the MFP 1 supplies operating power to the image-forming member 35, image-reading member 36, fax communication interface 37, user interface 38, USB interface 39, network interface 40, and NFC module 41. The standby state is a state in which the MFP 1 waits for a command issued through a user operation on the user interface 38 to perform image formation or image reading or for data related to image formation to be received through the network interface 40 or NFC module 41. Since operating power is supplied to the image-forming member 35, the MFP 1 immediately transitions from the standby state to an execution state for performing image formation with the image-forming member 35 when a command to execute image formation or data related to such image formation is received. Since operating power is supplied to the image-reading member 36, the MFP 1 immediately transitions from the standby state to an execution state for performing image reading with the image-reading member 36 when a command is issued to perform image reading with the image-reading member 36. After the MFP 1 has completed this image formation or image reading, the power consumption state returns to the standby state. In other words, the standby state is a state in which the main power supply of the MFP 1 is on and the state prior to transitioning to the panel sleep state, deep sleep state, and off-mode state described later while no commands for performing image formation or image reading have been received through user operations on the user interface 38, no instruction data related to image formation has been received via the network interface 40 or NFC module 41, and neither image formation with the image-forming member 35 nor image reading with the image-reading member 36 are being executed. Note that a state in which a settings menu other than the standby screen is displayed on the user interface 38 or a state in which an error notification of some type has been issued on the MFP 1 may be excluded from the standby state.

In the following description, "on" is used to express the supply of operating power from the low-voltage power supply 32 to the various components including the image-forming member 35, image-reading member 36, fax communication interface 37, user interface 38, USB interface 39, network interface 40, and NFC module 41, as well as the state in which operating power is being supplied, while "off" is used to express a stoppage in the supply of operating power to each component as well as the state in which the supply of operating power is halted.

When a duration T1 elapses after the MFP 1 has transitioned into the standby state during which time the MFP 1 received no commands to execute image formation or image reading and no data related to image formation, the power consumption state transitions from the standby state to a "panel sleep state." In the panel sleep state, the user interface 38 and in particular the liquid crystal display is turned off. Therefore, the MFP 1 in the panel sleep state consumes less power than in the standby state.

When an additional duration T2 elapses while the MFP 1 is in the panel sleep state without having received a command to execute image formation or image reading or data related to image formation, the power consumption state transitions from the panel sleep state to a "deep sleep state." In the deep sleep state, the image-forming member 35 and image-reading member 36 are turned off in addition to the liquid crystal display. However, the touchscreen 21 and other operating parts of the user interface 38, the fax communication interface 37, USB interface 39, the network interface 40, and the NFC module 41 (i.e., means for receiving commands to perform image formation or image reading, or data related to image formation) are kept on. Therefore, in the deep sleep state the MFP 1 enables the user to issue a command to perform an image process, such as image formation and image reading, through the touchscreen 21 and can receive data related to image formation from external devices. However, the fax communication interface 37 is transitioned to a power-saving state in the deep sleep state. The clock speed of the CPU provided in the MFP 1 is also reduced (clocked down) in the deep sleep state. Hence, the MFP 1 in the deep sleep state consumes even less power than in both the standby state and the panel sleep state.

The panel sleep state and the deep sleep state will also be collectively referred to as the "sleep state." Further, each of the durations T1 and "T1+T2" corresponds to the first duration in the claims.

In a case where a command to perform image formation or image reading or data related to image formation is received by the MFP 1 while in this sleep state (including the panel sleep state and deep sleep state), the power consumption state returns from this sleep state to the standby state, and each of the components that has been turned off is turned back on. Thereafter, the MFP 1 transitions from the standby state to an execution state for executing the image formation or image reading.

On the other hand, in a case where a duration T3 elapses after the MFP 1 has transitioned to the standby state without the MFP 1 having received a command to execute image formation or image reading or data related to image formation, the power consumption state transitions to the off-mode state. The duration T3 has a time length set individually from the durations T1 and T2 described above, and thus the MFP 1 may transition to the off-mode state from one of the standby state, panel sleep state, or deep sleep state. One exception is that the MFP 1 does not transition to the off-mode state while the MFP 1 has established communications with an external device, though the MFP 1 can transition to the sleep state while the MFP 1 has established communications with an external device. States in which the MFP 1 has established communication with an external device include a state in which the MFP 1 is connected to a LAN, Wi-Fi, or other network, a state in which the modem of the fax communication interface 37 is connected to a telephone line, a state in which an external device such as a USB memory device is connected to the USB receptacle 20 directly or via USB cable, and a state in which communication through the NFC module 41 is on. A state in which communication has been established with an external device does not necessarily mean a state in which communication is actively being performed with an external device but need only be a state in which communication is possible (or communication is ready).

In the off-mode state, the touchscreen 21 and other operating parts of the user interface 38, the fax communication interface 37, the USB interface 39, the network interface 40, and the NFC module 41 (i.e., means for receiving commands to perform image formation or image reading, or data related to image formation) are turned off in addition to the components that are turned off in the deep sleep state (the liquid crystal display of the user interface 38, the image-forming member 35, and image-reading member 36). Specifically, in the off-mode state, all components to which the low-voltage power supply 32 supplies operating power, excluding the power supply controller 33, are turned off. However, the sensor that detects a pressing operation (ON) on the power switch 22 may remain active in the off-mode state. Hence, in the off-mode state a user cannot issue a command through the touchscreen 21 to execute image formation or image reading, and the MFP 1 cannot receive data from an external source related to image formation. Since the supply of power to the USB interface 39 has been halted in this state, power is also no longer supplied to an external device connected to the USB receptacle 20. The off-mode state is the state in which the MFP 1 consumes the least amount of power (excluding the MFP 1 in the state in which the main power supply is off), consuming even less power than in the deep sleep state.

Essentially, the MFP 1 only returns from the off-mode state when the power switch 22 is pressed (turned on), at which time the power consumption state transitions from the off-mode state to the standby state.

Control Processes by the Controller

Next, the various control processes executed by the controller of the MFP 1 having the above configuration (as described above, as described above, the term "controller" collectively refers to the controller 31 and power supply controller 33), and particularly the control process executed for effecting the above state transitions, will be described with reference to FIG. 4. FIG. 4 is a flowchart showing steps in a main process performed by the MFP 1. The controller executes the main process after the main power supply of the MFP 1 is turned on. However, the flowchart in FIG. 4 particularly illustrates processes related to state transitions within the main process. The controller executes the various processes shown in the flowcharts of FIGS. 4-7 according to a program stored in the memory 34 of the MFP 1.

In step (hereinafter abbreviated as "S") 1 at the beginning of the process in FIG. 4, the controller performs a prescribed startup process (initialization process) as the power supply of the MFP 1 is turned on. In the startup process, the low-voltage power supply 32 of the MFP 1 supplies operating power to the image-forming member 35, image-reading member 36, fax communication interface 37, user interface 38, USB interface 39, network interface 40, and NFC module 41. As a result, the MFP 1 transitions to the standby state. The standby state is the state in which the MFP 1 waits for commands to perform image formation or image reading issued through user operations on the user interface 38 or data related to image formation received via the network interface 40 or NFC module 41. Since operating power is being supplied to the image-forming member 35, the MFP 1 can immediately transition from the standby state to an execution state for performing image formation with the image-forming member 35 when a command to execute image formation or data related to image formation is received. Since operating power is also being supplied to the image-reading member 36, the MFP 1 can immediately transition from the standby state to an execution state for performing image reading with the image-reading member 36 when a command is issued to perform image reading with the image-reading member 36. After the MFP 1 has completed this image formation or image reading, the power consumption state returns to the standby state.

In S2 the controller initializes a timer (timer value=0) and begins measuring an elapsed duration. The value measured by the timer indicates the elapsed time (elapsed duration) to the present from the most recent transition to the standby state. In other words, immediately after the main power for the MFP 1 is turned on, the controller measures the duration that has elapsed since the MFP 1 has entered the standby state following the main power having been turned on to the present time. When the MFP 1 has transitioned from another state (such as an execution state, panel sleep state, deep sleep state, or off-mode state) to the standby state, on the other hand, the controller measures the duration that has elapsed from the point in time that the MFP 1 has transitioned from that other state to the standby state to the present time.

In S3 the controller determines whether a command for image formation or image reading has been issued through a user operation on the user interface 38 or data related to image formation has been received via the network interface 40 or NFC module 41.

When the controller determines that a command to perform image formation or image reading or data related to image formation has been received (S3: YES), in S4 the controller transitions the MFP 1 to an execution state for performing image formation with the image-forming member 35 or image reading with the image-reading member 36. After image formation or image reading is completed, the controller returns the MFP 1 to the standby state, resets the timer, and resumes measuring an elapsed duration.

On the other hand, when the controller determines that neither a command to execute image formation or image reading nor data related to image formation has been received (S3: NO), the controller advances to S5.

In S5 the controller determines whether the current value of the timer is greater than or equal to the duration T1 (the first duration). Since the value of the timer indicates the time length that has elapsed since the MFP 1 has entered the standby state to the present time, as described above, in S5 the controller determines whether a duration T1 or more has elapsed since the MFP 1 has entered the standby state without having executed image formation or image reading. Note that the value of the duration T1 may be set through user operations to any time-length value from 1 minute to 20 minutes in a sleep time setting process described later (FIGS. 9 and 13), and the set value of the duration T1 is stored in the memory 34.

When the controller determines that the current value of the timer is greater than or equal to the duration T1 (S5: YES), in S6 the controller performs a panel sleep transition process described later (see FIG. 5). Through this process, the power consumption state of the MFP 1 is transitioned from the standby state to the panel sleep state. However, it is not desirable for the controller to transition the power consumption state to the panel sleep state while a settings menu other than the standby screen is displayed on the user interface 38 or while an error notification of some type is issued on the MFP 1.

In S7 the controller determines whether a command to perform image formation or image reading has been issued through a user operation on the user interface 38 or data related to image formation has been received via the network interface 40 or NFC module 41. In the panel sleep state, the liquid crystal display of the user interface 38 in particular is turned off, but the touchscreen 21 and other operating parts of the user interface 38, as well as the fax communication interface 37, USB interface 39, network interface 40, and NFC module 41 (i.e., means for receiving commands to execute image formation or image reading or data related to image formation) are kept on. Therefore, in the panel sleep state the user can issue commands to perform image formation and image reading through the touchscreen 21, and the MFP 1 can receive data related to image formation from external devices.

When the controller determines that a command to execute image formation or image reading has been issued through a user operation on the user interface 38 or data related to image formation has been received via the network interface 40 or NFC module 41 (S7: YES), the controller returns the MFP 1 to the standby state (returns to S1). In this case, since the YES determination is made in S7, a YES determination is made in S3, and thereafter in S4 the controller transitions the MFP 1 to an execution state for image formation with the image-forming member 35 or an execution state for image reading with the image-reading member 36.

On the other hand, when the controller determines that no command for executing image formation or image reading has been issued through a user operation on the user interface 38 and no data related to image formation has been received via the network interface 40 or NFC module 41 (S7: NO), the controller advances to S8.

In S8 the controller determines whether the current value of the timer is greater than or equal to the duration "T1+T2" (the first duration), i.e., whether an additional duration T2 has elapsed since the MFP 1 has been transitioned to the panel sleep state without satisfying a condition for canceling the panel sleep state. The time-length value of the duration "T1+T2" is set through user operations to any time from 1 minute to 50 minutes in a sleep time setting process described later (FIGS. 9 and 13), and the set time-length value of the duration "T1+T2" is stored in the memory 34.

When the controller determines that the current value of the timer is greater than or equal to the duration T1+T2 (S8: YES), in S9 the controller performs a deep sleep transition process described later (see FIG. 6). Through this process, the power consumption state of the MFP 1 is transitioned from the panel sleep state to the deep sleep state.

In S10 the controller again determines whether a command to execute image formation or image reading has been issued through a user operation on the user interface 38 or data related to image formation has been received via the network interface 40 or NFC module 41. In the deep sleep state, the image-forming member 35 and image-reading member 36 are turned off in addition to the liquid crystal display of the user interface 38, but the touchscreen 21 and other operating parts of the user interface 38, as well as the fax communication interface 37, USB interface 39, network interface 40, and NFC module 41 (i.e., means for receiving commands to execute image formation or image reading and data related to image formation) are kept on (although the fax communication interface 37 is in a power-saving state). Therefore, in the deep sleep state the user can issue commands to execute image formation or image reading through the touchscreen 21, and the MFP 1 can receive data related to image formation from external devices.

When the controller determines that a command to execute image formation or image reading has been issued through a user operation on the user interface 38 or data related to image formation has received via the network interface 40 or NFC module 41 (S10: YES), the controller returns the MFP 1 to the standby state (returns to S1). In this case, since the YES determination is made in S10, a YES determination is made in S3, and thereafter in S4 the controller transitions the MFP 1 to an execution state for image formation with the image-forming member 35 or an execution state for image reading with the image-reading member 36.

On the other hand, when the controller determines that no command to execution image formation or image reading has been issued through a user operation on the user interface 38 and no data related to image formation has been received via the network interface 40 or NFC module 41 (S10: NO), the controller advances to S11.

In S11 the controller determines whether the current value of the timer is greater than or equal to the duration T3 (the second duration). Since the value of the timer indicates the amount of elapsed time since the MFP 1 has entered the standby state to the present time, as described above, in S11 the controller determines whether a duration T3 or more has elapsed since the MFP 1 has entered the standby state without executing image formation or image reading. The time-length value of the duration T3 is set based on user operations in an off-mode time setting process described later (FIGS. 11 and 15) to one of 20 minutes, 1 hour, 2 hours, 4 hours, 8 hours, or an OFF setting in which the MFP 1 never enters the off-mode state regardless of elapsed duration, and the set time-length value of the duration T3 is stored in the memory 34. In S11 the controller also determines whether the MFP 1 establishes communication with an external device. As an exception in which transition to the off-mode does not occur when the duration T3 or more has elapsed, the MFP does not transition the MFP 1 to the off-mode state in a state where communication is established with an external device. Note that the MFP 1 transitions the MFP 1 to the panel sleep state or deep sleep state even in a state where communication is established with an external device. The controller determines whether communication has been established with an external device according to a communication status flag stored in the memory 34. This communication status flag will be described later in detail (see FIG. 8).

When the controller determines that the current value of the timer is greater than or equal to the duration T3 (second duration) and the communication status flag (described later) indicates "FALSE" (the MFP 1 establishes no communication with the external device) (S11: YES), in S14 the controller performs an off-mode transition process described later (see FIG. 7). As a result, the power consumption state of the MFP 1 is transitioned to the off-mode state. However, when the controller determines that the current value of the timer is less than the duration T3 (second duration) or the communication flag (described later) indicates "TRUE" (the MFP 1 establishes communication with the external device) (S11: NO), the controller returns to S10 and the MFP 1 remains in the deep sleep state.

Further, when the controller determines in S5 that the current value of the timer is less than the duration T1 (S5: NO) or when the controller determines in S8 that the current value of the timer is less than the duration T1+T2 (S8: NO), in S12 or S13 the controller determines whether the current value of the timer greater than or equal to the duration of the duration T3 and the communication status flag (described later) indicates "FALSE", as in S11 described above. Since the duration T3 is set individually from the durations T1 and T2 in this example, the MFP 1 can be transitioned to the off-mode state from any of the standby state, panel sleep state, and deep sleep state. Specifically, when comparing the longest setting time lengths for the durations T1 and T1+T2 (the upper limits of time lengths (the upper limits time-length values) that can be set for the durations T1 and T1+T2; 20 minutes and 50 minutes, respectively, in this embodiment) to the shortest setting time for the duration T3 (the lower limit of time length (the lower limit time-length value) that can be set for the duration T3; 20 minutes in this embodiment), the shortest setting time length for the duration T3 is either the same as or less shorter than both the longest setting time lengths for the durations T1 and T1+T2. Here, in this example, the shortest setting time length for the duration T3 (20 minutes) is the same as the longest setting time length for the duration T1. However, the duration T3 may be set to a time-length value less (shorter) than both the time-length values of the durations T1 and T1+T2. In such a case, the controller can bypass the sleep state and transition the MFP 1 directly from the standby state to the off-mode state. For example, the time-length value settable for the duration T1 falls within the range from 1 minute to 20 minutes, the time length value settable for the duration T1+T2 falls within the range from 1 minutes to 50 minutes, and the time-length value settable for the duration T3 falls within a range from 15 minutes to 8 hours or the OFF setting. In this case, the lower limit of the range for the duration T3 (15 minutes) is less than the upper limit of the ranges for the duration T1 and T1+T2 (20 minutes and 50 minutes). As described above, the durations T1, T2, and T3 are set individually. In other words, the durations T1, T2, and T3 are set independently within their ranges respectively. That is, the durations T1, T2, and T3 are set in such a manner that the setting of the time-length value of the duration T3 is not influenced by the settings of the time-length value for the duration T1 and the time-length value for the duration T1+T2. Further, the durations T1, T2, and T3 are settable in such a manner that the duration T3 is allowed to be less than both the duration T1 and the duration T1+T2. Alternatively, the durations T1 and T3 may be set independently within their ranges (a first range and a second range) respectively. That is, the durations T1 and T3 may be set in such a manner that the setting of the time-length value of the duration T3 is not influenced by the setting of the time-length value for the duration T1. Further, the durations T1 and T3 may be settable in such a manner that the duration T3 is allowed to be less than the duration T1.

When the controller determines that the current value of the timer is greater than or equal to the duration T3 and the communication status flag (described later) indicates "FALSE" (S12: YES or S13: YES), in S14 the controller executes the off-mode transition process described later (see FIG. 7). As a result, the power consumption state of the MFP 1 transitions to the off-mode state. However, it is preferable for the MFP 1 not to transition to the off-mode state while a settings menu other than the standby screen is displayed on the user interface 38 or while an error notification of some type has been issued on the MFP 1. On the other hand, when the controller determines in S12 that the current value of the timer is less than the duration T3 or the communication flag (described later) indicates "TRUE" (S12: NO), the controller returns to S7 and the MFP 1 remains in the panel sleep state. Further, when the controller determines in S13 that the current value of the timer is less than the duration T3 or the communication flag (described later) indicates "TRUE" (S13: NO), the controller returns to S3 and the MFP 1 remains in the standby state.

In the off-mode state, the touchscreen 21 and other operating parts of the user interface 38, as well as the fax communication interface 37, USB interface 39, network interface 40, and NFC module 41 (i.e., means for receiving commands to perform image formation or image reading or data related to image formation) are turned off in addition to the components that are turned off in the deep sleep state (the liquid crystal display of the user interface 38, the image-forming member 35, and image-reading member 36). Hence, in the off-mode state, the user cannot issue a command through the touchscreen 21 to execute image formation or image reading, and the MFP 1 cannot receive data related to image formation from an external device. Once transitioned to the off-mode state, essentially the MFP 1 can return from the off-mode state only when the power switch 22 is pressed (turned on). That is, when the power switch 22 is pressed, the controller returns to S1, and the power consumption state is transitioned from the off-mode state to the standby state.

Figure 5:
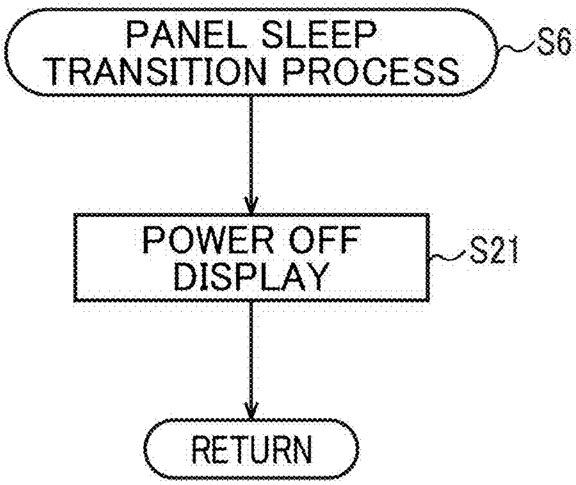
FIG. 5 is a flowchart illustrating a panel sleep transition process.

Next, the panel sleep transition process executed in S6 of FIG. 4 will be described with reference to FIG. 5. FIG. 5 is a flowchart showing the panel sleep transition process.

In S21 of FIG. 5, the power supply controller 33 stops the supply of operating power from the low-voltage power supply 32 to the user interface 38, and particularly to the liquid crystal display. This action transitions the MFP 1 to the panel sleep state. The MFP 1 consumes less power in the panel sleep state than in the standby state because the supply of power to the liquid crystal display is stopped.

As described above, in the panel sleep transition process of S6, the controller transitions the image forming device to a panel sleep state (one example of the sleep state) from a standby state under a condition that the duration elapses with the MFP 1 maintained in the standby state since a start of the standby state.

Figure 6:
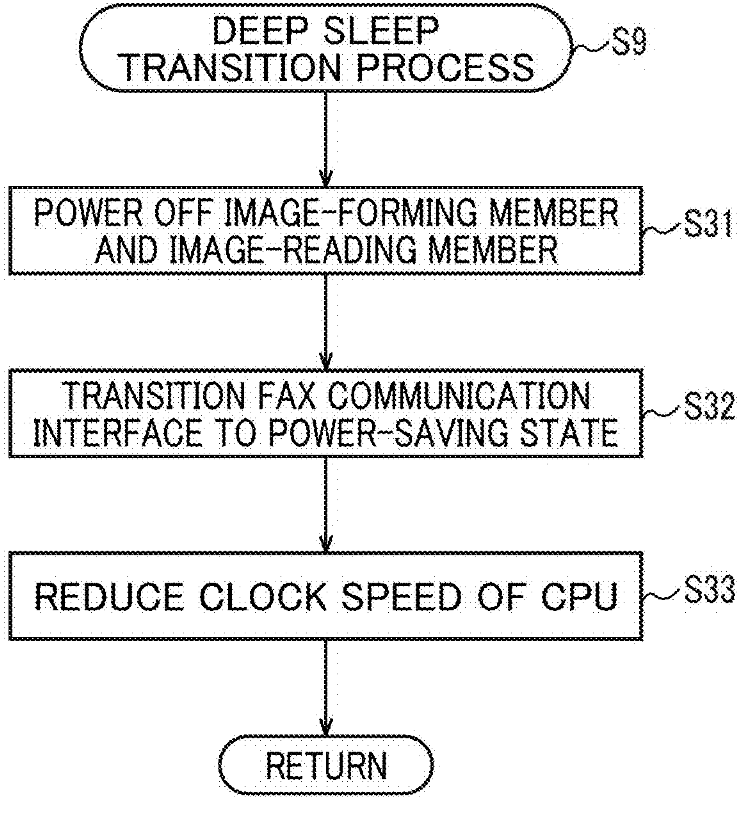
FIG. 6 is a flowchart illustrating a deep sleep transition process.

Next, the deep sleep transition process executed in S9 of FIG. 4 will be described with reference to FIG. 6. FIG. 6 is a flowchart showing steps in the deep sleep transition process.

In S31 at the beginning of the process in FIG. 6, the power supply controller 33 stops the supply of operating power from the low-voltage power supply 32 to the image-forming member 35 and the image-reading member 36.

In S32 the power supply controller 33 instructs the fax communication interface 37 to transition to a power-saving state, whereby the fax communication interface 37 transitions to the power-saving state.

In S33 the power supply controller 33 reduces the clock speed of CPU(s) (clocks down CPU(s)) provided in the MFP 1. The CPUs whose clock speeds are to be reduced may be some or all of the CPUs in the MFP 1.

Through the above process, the MFP 1 transitions to the deep sleep state. The MFP 1 in the deep sleep state consumes even less power than in both the standby state and the panel sleep state.

Figure 7:
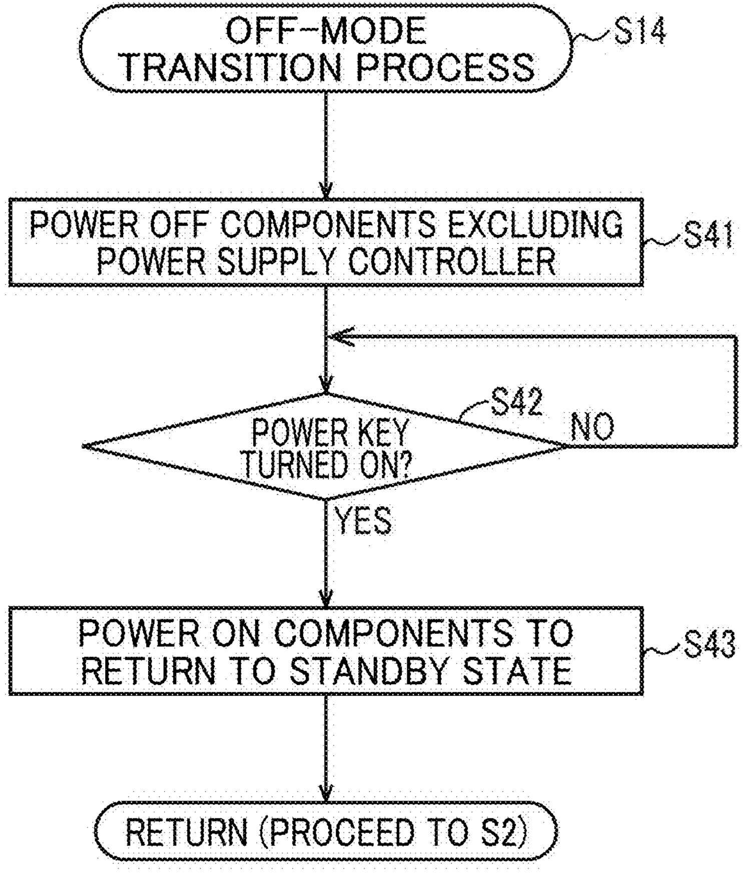
FIG. 7 is a flowchart illustrating an off-mode transition process.

Next, the off-mode transition process executed in S14 of FIG. 4 will be described with reference to FIG. 7. FIG. 7 is a flowchart showing steps in the off-mode transition process.

In S41 at the beginning of the process in FIG. 7, the power supply controller 33 stops supplying operating power to the touchscreen 21 and other operating parts of the user interface 38, as well as the fax communication interface 37, USB interface 39, network interface 40, and NFC module 41, in addition to the components that are turned off in the deep sleep state described above (the liquid crystal display of the user interface 38, the image-forming member 35, and image-reading member 36). Specifically, all components to which the low-voltage power supply 32 supplies operating power, excluding the power supply controller 33, are turned off. However, the sensor that detects a pressing operation [ON] on the power switch 22 may remain active.

Through this action, the MFP 1 is transitioned to the off-mode state. In the off-mode state, the user cannot issue a command through the touchscreen 21 to execute image formation or image reading, and the MFP 1 cannot receive data related to image formation from an external source. Since the supply of power to the USB interface 39 has been halted in this state, power is also no longer supplied to an external device connected to the USB receptacle 20. In exchange, the off-mode state is the state in which the MFP 1 consumes the least amount of power (excluding the MFP 1 in the state in which the main power supply is off), consuming even less power than in the deep sleep state.

In S42 the power supply controller 33 monitors whether the power switch 22 has been pressed (turned on).

When the power supply controller 33 determines that the power switch 22 has been pressed (S42: YES), in S43 the power supply controller 33 begins supplying operating power from the low-voltage power supply 32 to each of the components that have been turned off in S41. As a result, the MFP 1 is returned to the standby state. Subsequently, the controller advances to S2 of FIG. 4.

On the other hand, when the power supply controller 33 determines that the power switch 22 has not been pressed (S42: NO), the MFP 1 is maintained in the off-mode state and repeats the process of S42.

In the deep sleep transition process of S9 as described above, the controller transitions the MFP 1 to the off-mode state from the standby state under a condition that the duration T3 elapses with the MFP 1 maintained in the standby state since the start of the standby state (S13: YES).

Figure 8:
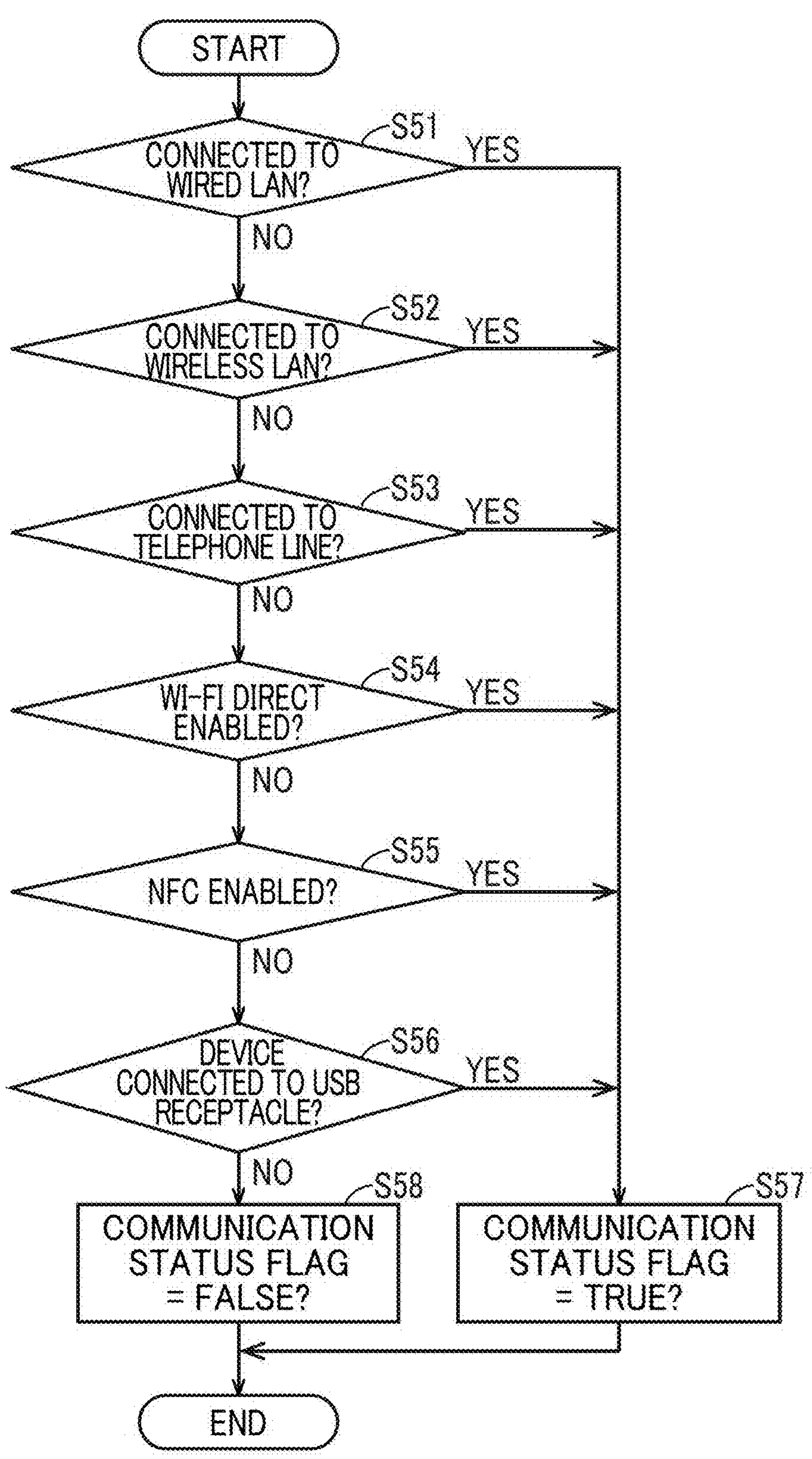
FIG. 8 is a flowchart illustrating a communication status determination process.

Next, various processes executed by the controller of the MFP 1 having the above configuration (as described above, the term "controller" collectively refers to the controller 31 and power supply controller 33), and particularly the control process executed for determining whether the MFP 1 has established communication with an external device, will be described with reference to FIG. 8. FIG. 8 is a flowchart showing steps in a communication status determination process performed on the MFP 1. This process is executed in parallel with the main process of FIG. 4 when the MFP 1 is in any state other than the off-mode state. The controller executes the various processes shown in the flowchart of FIG. 8 according to a program stored in the memory 34 of the MFP 1.

In S51 at the beginning of the process in FIG. 8, the controller checks the network connection status of the network interface 40 to determine whether the network interface 40 is connected to a wired LAN in particular. Note that to reach YES determination in S51 it is sufficient for the network interface 40 to be in a state capable of communicating according to wired LAN (a link-up) in S51 and need not be actually communicating via the wired LAN.

In S52 the controller checks the network connection status of the network interface 40 to determine whether the network interface 40 is connected to a wireless LAN in particular. Here, to reach YES determination in S52 the network interface 40 need only be in a state capable of communicating through wireless LAN (a state in which the wireless LAN is set to be enabled) in S52 and need not be actually communicating via wireless LAN.

In S53 the controller determines whether the modem of the fax communication interface 37 is connected to a telephone line. Specifically, the modem is connected when the exchange-side interface of the modem of the fax communication interface 37 is powered on and disconnected when the exchange-side interface of the modem of the fax communication interface 37 is powered off.

In S54 the controller checks the network connection status of the network interface 40 to determine in particular whether the Wi-Fi Direct setting is enabled. Wi-Fi Direct is a communication standard that allows two devices to establish a direct Wi-Fi connection without an intermediary access point. To reach YES determination in S54 the network interface 40 may simply be capable of communicating according to Wi-Fi Direct and need not actually be conducting communication using Wi-Fi Direct.

In S55 the controller checks the setting status of the NFC module 41 to determine whether the setting of the NFC module 41 is enabled. To reach YES determination in S55 it is sufficient that the NFC module 41 is capable of communicating through NFC in S55 and need not actually be performing communication according to NFC.

In S56 the controller checks the connection status of the USB interface 39 to determine in particular whether an external device such as a USB memory is currently connected to the USB receptacle 20 directly or via USB cable. When an external device is connected via a USB cable, the condition for communication being established is that the external device is not only physically connected but is powered on (i.e., started up), regardless of whether data communication via the USB interface 39 is actually being conducted. When an external device such as a card reader that does not store data itself but reads data from other storage media is connected to the USB receptacle 20, communication is preferably considered not to be established unless a storage medium to be read is present (the storage medium is connected to the external device such as the card reader).

When at least one of the conditions in S51-S56 described above is satisfied (any of S51-S56: YES), the controller determines that communication has been established between the MFP 1 and an external device, and in S57 reads the communication status flag from the memory 34 and assigns the value "TRUE" to the flag.

However, when none of the conditions in S51-S56 is met (all of S51-S56: NO), the controller determines that communication has not been established between the MFP 1 and an external device, and in S58 reads the communication status flag from the memory 34 and assigns the value "FALSE" to the flag.

The communication status determination process shown in FIG. 8 is executed repeatedly at predetermined intervals in parallel to the main process of FIG. 4 while the MFP 1 is in any state other than the off-mode state. Hence, the communication status flag is updated in real time based on the current communication status of the MFP 1.

Figure 9:
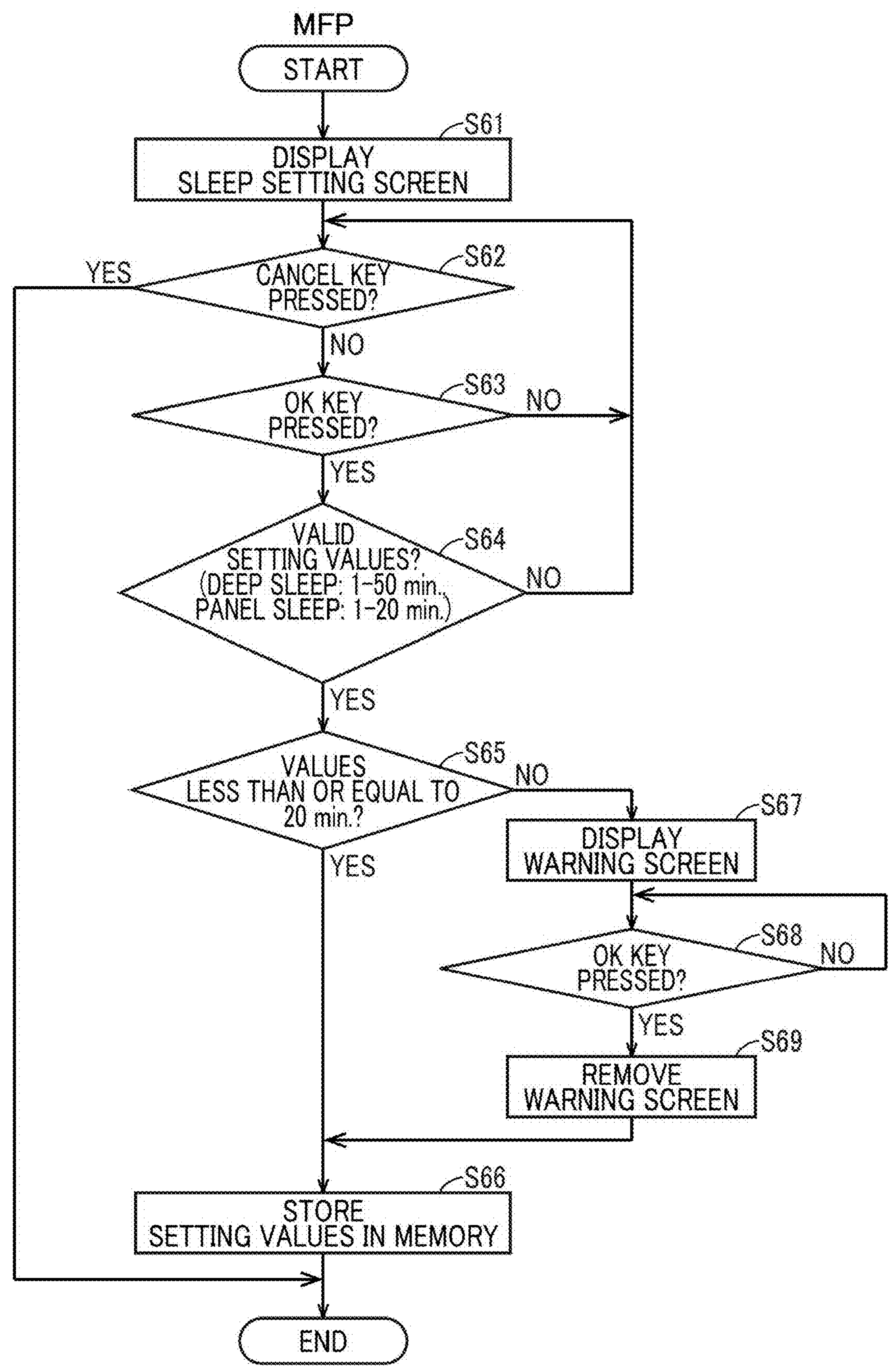
FIG. 9 is a flowchart illustrating a sleep transition time setting process executed by the MFP.

Next, various processes executed by the controller of the MFP 1 (the term "controller" collectively refers to the controller 31 and power supply controller 33), and particularly a control process for setting the durations until the MFP 1 transitions to the panel sleep state and the deep sleep state, will be described with reference to FIG. 9. FIG. 9 is a flowchart illustrating steps in a sleep transition time setting process performed on the MFP 1. The controller starts the sleep transition time setting process when a predetermined operation is received through the standby screen displayed on the user interface 38 while the MFP 1 is in the standby state. The controller executes the following processes shown in the flowchart of FIG. 9 according to a program stored in the memory 34 of the MFP 1.

Figures 10A, 10B, 10C, 10D:
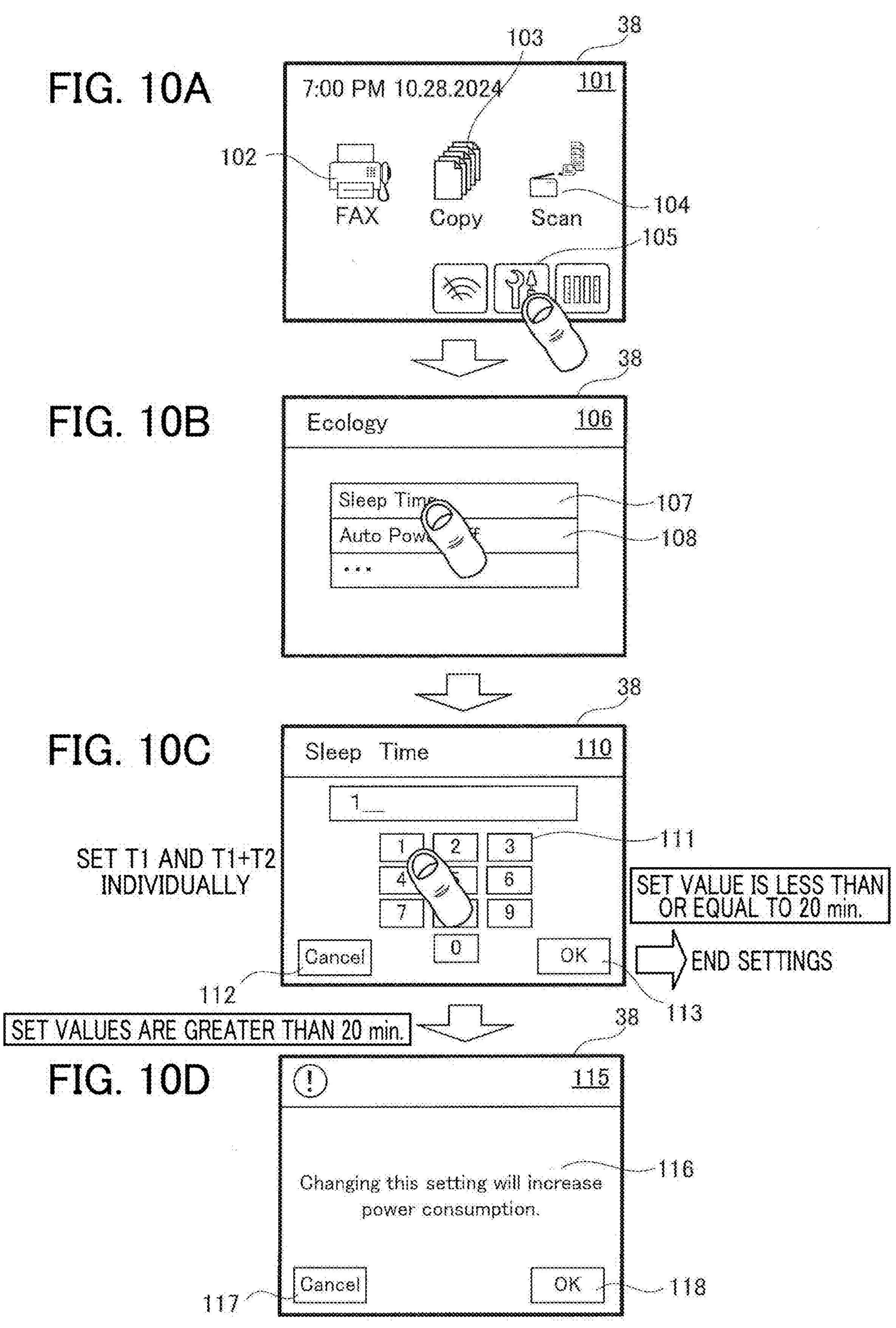
FIGS. 10A-10D are explanatory diagrams illustrating operations with the MFP for setting durations for transition to sleep states.

In S61 at the beginning of the process in FIG. 9, the controller displays a sleep setting screen 101 (FIG. 10C) on the user interface 38. As shown in FIG. 10A, the controller displays a standby screen 101 on the user interface 38 when the MFP 1 is in the standby state. The standby screen 101 in FIG. 10A includes icons that are operated to perform various executable functions on the MFP 1. For example, the standby screen 101 includes an icon 102 for executing a fax function, an icon 103 for executing a copy function, and an icon 104 for executing a scan function. Displayed beneath the icons 102-104 are other icons including a settings icon 105 that is operated to set the durations until the MFP 1 transitions to the panel sleep state and deep sleep state. As described above, the user interface 38 is a touchscreen that also functions as a display. The user can select each icon (option) displayed on the standby screen 101 through a touch operation. When the user performs an operation in the standby screen 101 to select the settings icon 105 in particular, the controller displays a setting items screen 106 on the user interface 38, as shown in FIG. 10B. The setting items screen 106 includes a sleep setting icon 107 that is operated to set the durations until the MFP 1 transitions to a sleep state, and an off-mode setting icon 108 that is operated to set the duration until the MFP 1 transitions to the off-mode state. When the user performs an operation in the setting items screen 106 to select the sleep setting icon 107 in particular, the controller displays the sleep setting screen 110 on the user interface 38, as illustrated in FIG. 10C.

The sleep setting screen 110 includes a numeric keypad 111 for inputting numbers, a Cancel key 112, and an OK key 113. Numbers inputted through the numeric keypad 111 are displayed a field above the keypad. Using the numeric keypad 111, the user can directly input each of the duration T1 until the MFP 1 transitions from the standby state to the panel sleep state, and the duration T1+T2 until the MFP 1 transitions from the standby state to the deep sleep state. Here, the user may be allowed to input the time T2 in place of the duration T1+T2. Alternatively, the duration T2 may be a fixed time (e.g., 30 minutes), and the user may only be allowed to input a time-length value for the duration T1. In general, the time-length value for the duration T1 can be inputted as a value in one-minute increments from 1 to 20 minutes, and the time-length value for the duration T1+T2 can be inputted as a value in one-minute increments from 1 to 50 minutes. While the number inputted for the duration T1+T2 in this embodiment must be equal to or greater than the duration T1, the user may also be allowed to input a number smaller than the duration T1 for the duration T1+T2. In this case, the MFP 1 will only transition from the standby state to the deep sleep state and will never enter the panel sleep state.

When the user operates the Cancel key 112 in the sleep setting screen 110 before operating the OK key 113 (S62: YES), the controller ends the sleep transition time setting process. In this case, the time-length values for the duration T1 and the duration T1+T2 are not updated, and the previous time-length values for the durations T1 and T1+T2 continue to be applied.

On the other hand, when the user operates the OK key 113 in the sleep setting screen 110 (S62: NO, S63: YES), in S64 the controller determines whether the user has inputted valid setting values (valid time-length values) for the durations T1 and T1+T2 using the numeric keypad 111 at the time the OK key 113 has been operated. Specifically, a valid setting value (valid time-length value) is one of the one-minute increments between 1 and 20 minutes for the duration T1, and a valid setting value (valid time-length value) is one of the one-minute increments between 1 and 50 minutes for the duration T1+T2, but these ranges can be modified as appropriate.

When the controller determines that the user has inputted valid setting values (valid time-length values) for the durations T1 and T1+T2 using the numeric keypad 111 at the time of operation of the OK key 113 (S64: YES), the controller advances to S65. However, when the controller determines that at least one setting value (at least one time-length value) inputted is invalid for the durations T1 and T1+T2 (S64: NO) or when the controller determines in S63 that the OK key 113 has not been operated (S63: NO), the controller continues to display the sleep setting screen 110 without making the settings inputted by the user effective and prompts the user to input valid setting values (valid time-length values). The controller may also display a warning to inform the user that one or two invalid setting values (one or more invalid time-length values) have been inputted.

In S65 the controller determines whether the user-inputted time-length values for the durations T1 and T1+T2 are both less than or equal to 20 minutes (an example of the reference value and the first reference value).

When the controller determines that the user-inputted time-length values are less than or equal to 20 minutes for both the durations T1 and T1+T2 (S65: YES), in S66 the user-inputted time-length values are made effective as the new setting values for the durations T1 and T1+T2 and are stored in the memory 34. That is, the setting values (time-length values) for the durations T1 and T1+T2 are updated based on the user-inputted time-length values.

However, when the controller determines that the user-inputted time-length value for at least one of the durations T1 and T1+T2 is greater than 20 minutes (S65: NO), in S67 the controller displays a warning screen 115, as shown in FIG. 10D, to warn the user. The warning screen 115 includes warning text 116, as a warning content, informing the user that a sufficient power-saving effect cannot be achieved with the current settings. The warning screen 115 further includes a Cancel key 117, and an OK key 118. In S68 the controller determines whether the OK key 118 has been operated. When the user has operated the OK key 118 after viewing the warning content (S68: YES), in S69 the controller removes the warning screen 115. In S66 the controller makes the user inputted time-length values effective as the new settings for the durations T1 and T1+T2 and stores these time-length values in the memory 34. That is, the setting values (time-length values) for the durations T1 and T1+T2 are updated based on the user inputted time-length values. On the other hand, when the user operates the Cancel key 117 after viewing the warning content, the controller redisplays the sleep setting screen 110 shown in FIG. 10C (returns to the process of S61). The controller waits for an operation on the key 117 or 118 on the warning screen 115 while no operation is made on any key (S68: NO).

Figure 11:
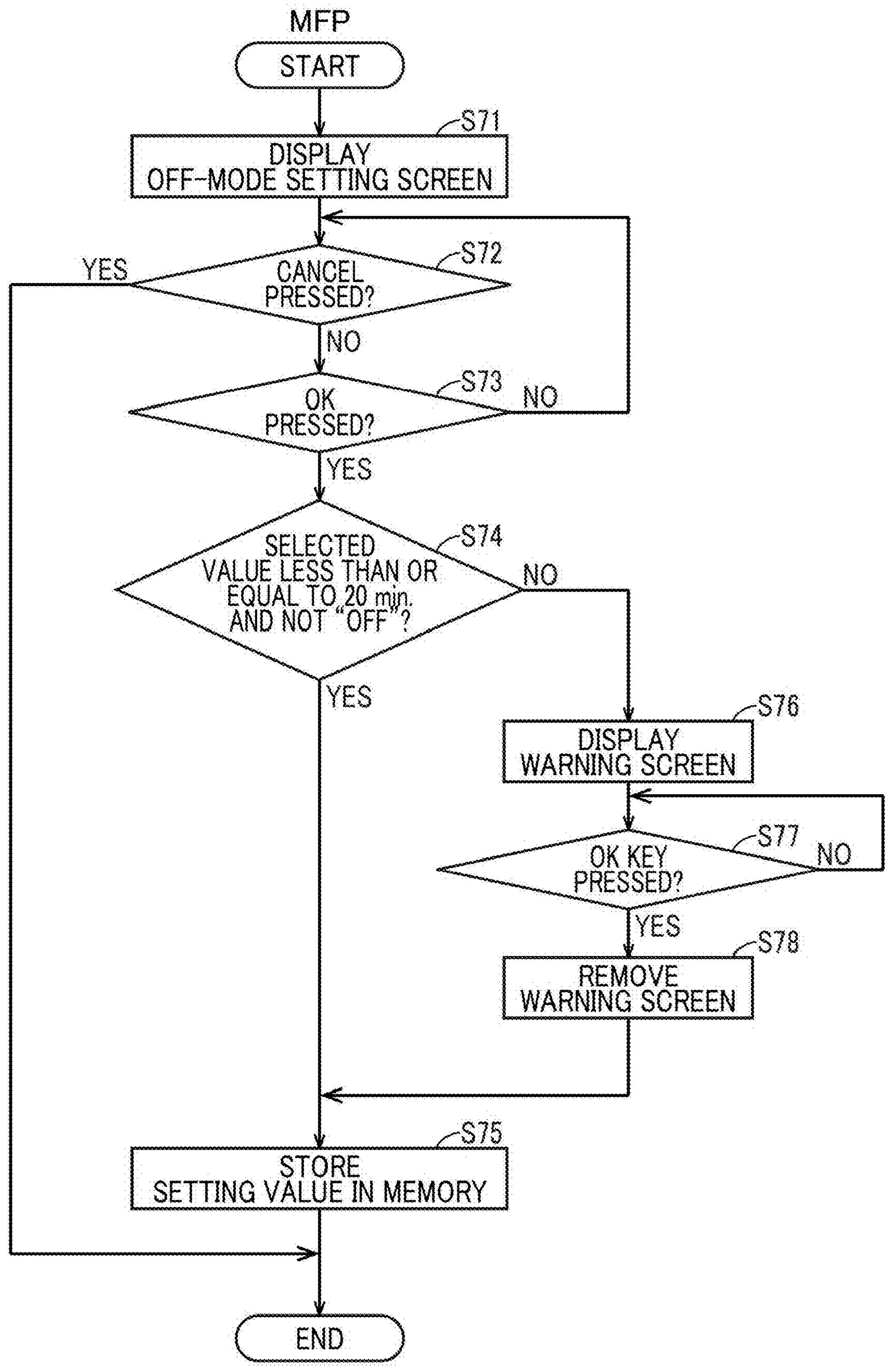
FIG. 11 is a flowchart illustrating an off-mode transition time setting process executed by the MFP.

Next, various processes executed by the controller of the MFP 1 (as described above, the term “controller” collectively refers to the controller 31 and power supply controller 33), and particularly the process for setting the duration until the MFP 1 transitions to the off-mode state, will be described with reference to FIG. 11. FIG. 11 is a flowchart illustrating steps in the off-mode transition time setting process performed on the MFP 1. The controller executes this process while the MFP 1 is in the standby state after receiving a prescribed operation through the standby screen displayed on the user interface 38. The controller executes the following processes shown in the flowchart of FIG. 11 based on a program stored in the memory 34 of the MFP 1.

Figures 12A, 12B, 12C, 12D:
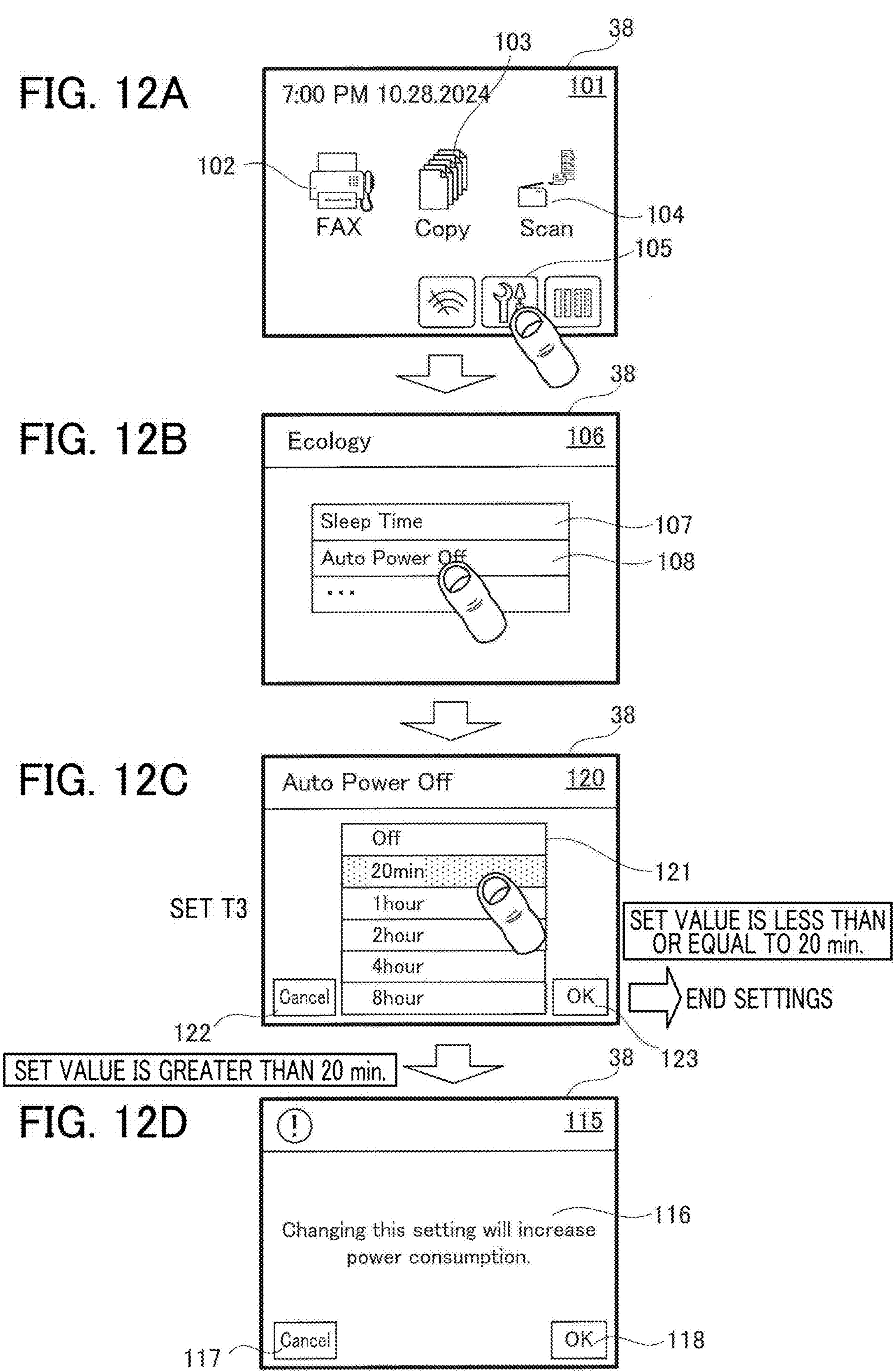
FIGS. 12A-12D are explanatory diagrams illustrating operations with the MFP for setting duration for transition to the off-mode state.

In S71 at the beginning of the process in FIG. 11, the controller displays an off-mode setting screen 120 (FIG. 12C) on the user interface 38. As shown in FIG. 12A, the controller displays the standby screen 101 on the user interface 38 when the MFP 1 is in the standby state. The standby screen 101 in FIG. 12A includes icons that are operated to perform various executable functions on the MFP 1. For example, the standby screen 101 includes the icon 102 for executing the fax function, the icon 103 for executing the copy function, and the icon 104 for executing the scan function. Displayed beneath the icons 102-104 are other icons including the settings icon 105 that is operated to set the duration until the MFP 1 transitions to the off-mode state. As described above, the user interface 38 is a touchscreen that also functions as a display. The user can select each icon (option) displayed in the standby screen 101 through a touch operation. When the user performs an operation in the standby screen 101 to select the settings icon 105 in particular, the controller displays the setting items screen 106 shown in FIG. 12B on the user interface 38. The setting items screen 106 includes the sleep setting icon 107 that is operated to set the duration until the MFP 1 transitions to the sleep state, and the off-mode setting icon 108 that is operated to set the duration until the MFP 1 transitions to the off-mode state. When the user performs an operation in the setting items screen 106 to select the off-mode setting icon 108 in particular, the controller displays the off-mode setting screen 120 shown in FIG. 12C on the user interface 38.

The off-mode setting screen 120 displays various durations as selection options in a pull-down list 121. Through the pull-down list 121, the user can select a time-length value of the duration T3 for transitioning from the standby state to the off-mode state. Specifically, the user can select one of 20 minutes, 1 hour, 2 hours, 4 hours, and 8 hours. There is also an OFF setting in which the MFP 1 does not transition to the off-mode state regardless of elapsed duration. The off-mode setting screen 120 further includes a Cancel key 122, and an OK key 123.

In S72 the controller determines whether the Cancel key 122 has been operated in the off-mode setting screen 120 without an operation of the OK key 123. When the controller determines that the Cancel key 122 has been operated prior to the OK key 123 (S72: YES), the controller ends the off-mode transition time setting process. In this case, the controller does not update the setting value (the time-length) for the duration T3 but continues to apply the previous setting value (previous time-length value) for the duration T3.

On the other hand, when the controller determines that the OK key 123 has been operated in the off-mode setting screen 120 (S72: NO, S73: YES), in S74 the controller determines whether the time-length value selected in the pull-down list 121 for the duration T3 at the timing that the user operated the OK key 123 is less (shorter) than or equal to 20 minutes (an example of the reference value and the second reference value). Note that T3=co in the OFF setting and, hence, is considered greater than 20 minutes.

When the controller determines that the user-selected duration for T3 is 20 minutes or shorter (S74: YES), in S75 the controller makes the user-selected duration effective as the new setting value for the duration T3 and stores this setting value (time-length value) in the memory 34. That is, the setting value for the duration T3 is updated.

However, when the controller determines that the user-selected time-length value for the duration T3 is greater (longer) than 20 minutes (S74: NO), in S76 the controller displays the warning screen 115 shown in FIG. 12D to warn the user. The warning screen 115 includes the warning text 116, as a warning content, to inform the user that a sufficient power-saving effect cannot be achieved with the current setting. The warning screen 115 also includes the Cancel key 117 and OK key 118. When the user operates the OK key 118 after viewing the warning content (S77: YES), in S78 the controller removes the warning screen 115 and in S75 makes the user-selected time-length value effective as the new setting value (time-length value) for the duration T3 and stores this setting value (time-length value) in the memory 34. That is, the setting value (time-length value) for the duration T3 is updated. However, when the user operates the Cancel key 117 after viewing the warning content, the controller redisplays the off-mode setting screen 120 shown in FIG. 12C (returns to the process of S71). The controller waits for an operation on the key 117 or 118 on the warning screen 115 while no operation is made on any key (S77: NO).

Figure 13:
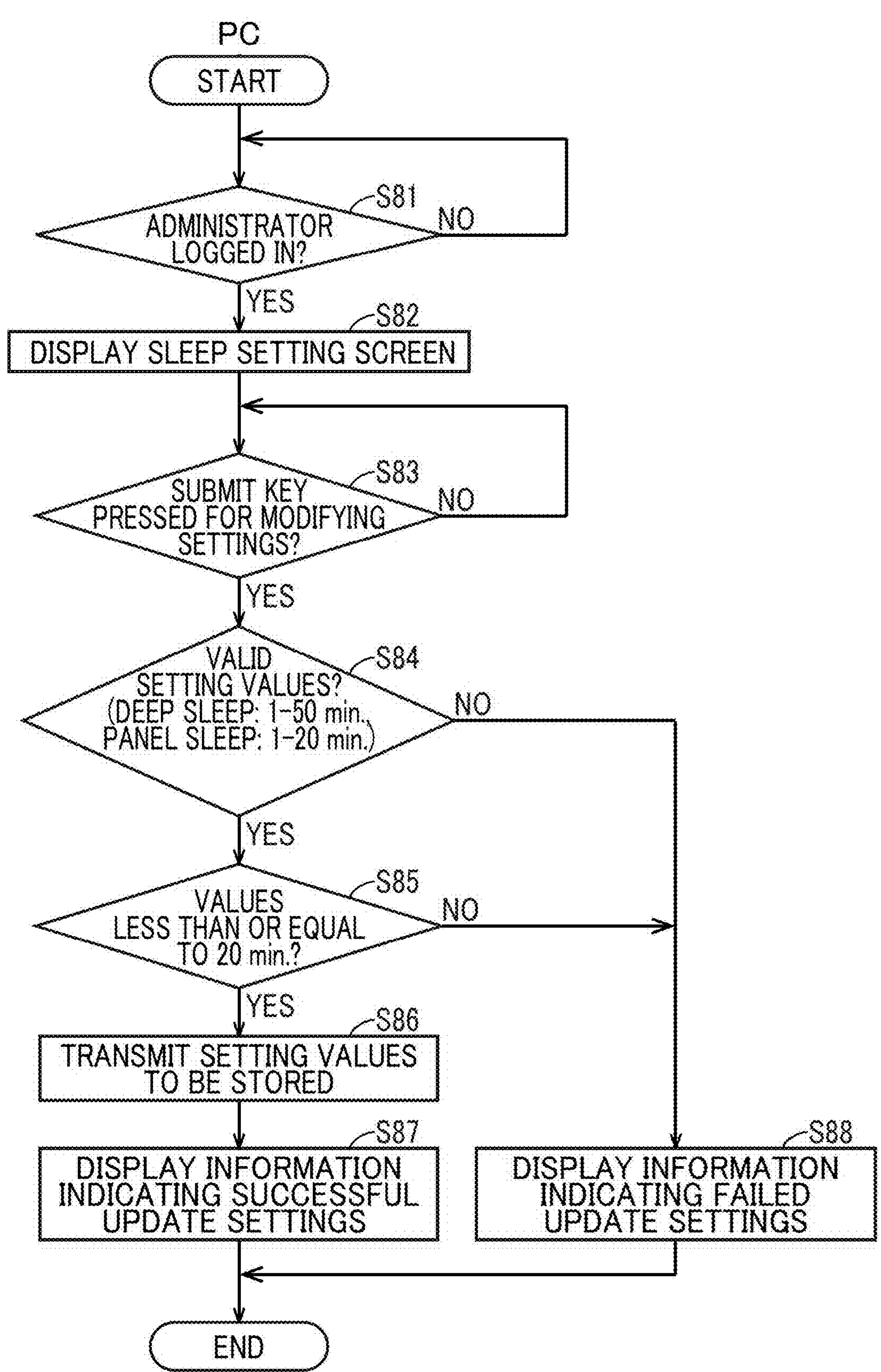
FIG. 13 is a flowchart illustrating a sleep transition time setting process executed by a terminal.

Next, various control processes executed by the controller of the PC 50 that is an example of an external terminal connected to and capable of communicating with the MFP 1, and particularly a control process related to setting durations until the MFP 1 transitions to the panel sleep state and the deep sleep state, will be described with reference to FIG. 13. FIG. 13 is a flowchart showing steps in a sleep transition time setting process performed on the PC 50. This process is executed after an MFP settings app pre-installed on the PC 50 is started. The controller of the PC 50 executes the following processes indicated in the flowchart of FIG. 13 based on a program stored in a memory of the PC 50. The MFP 1 and PC 50 may be connected by any means or manners through which data can be exchanged, such as a wireless LAN, wired LAN, or USB connection.

Figures 14A, 14B, 14C:
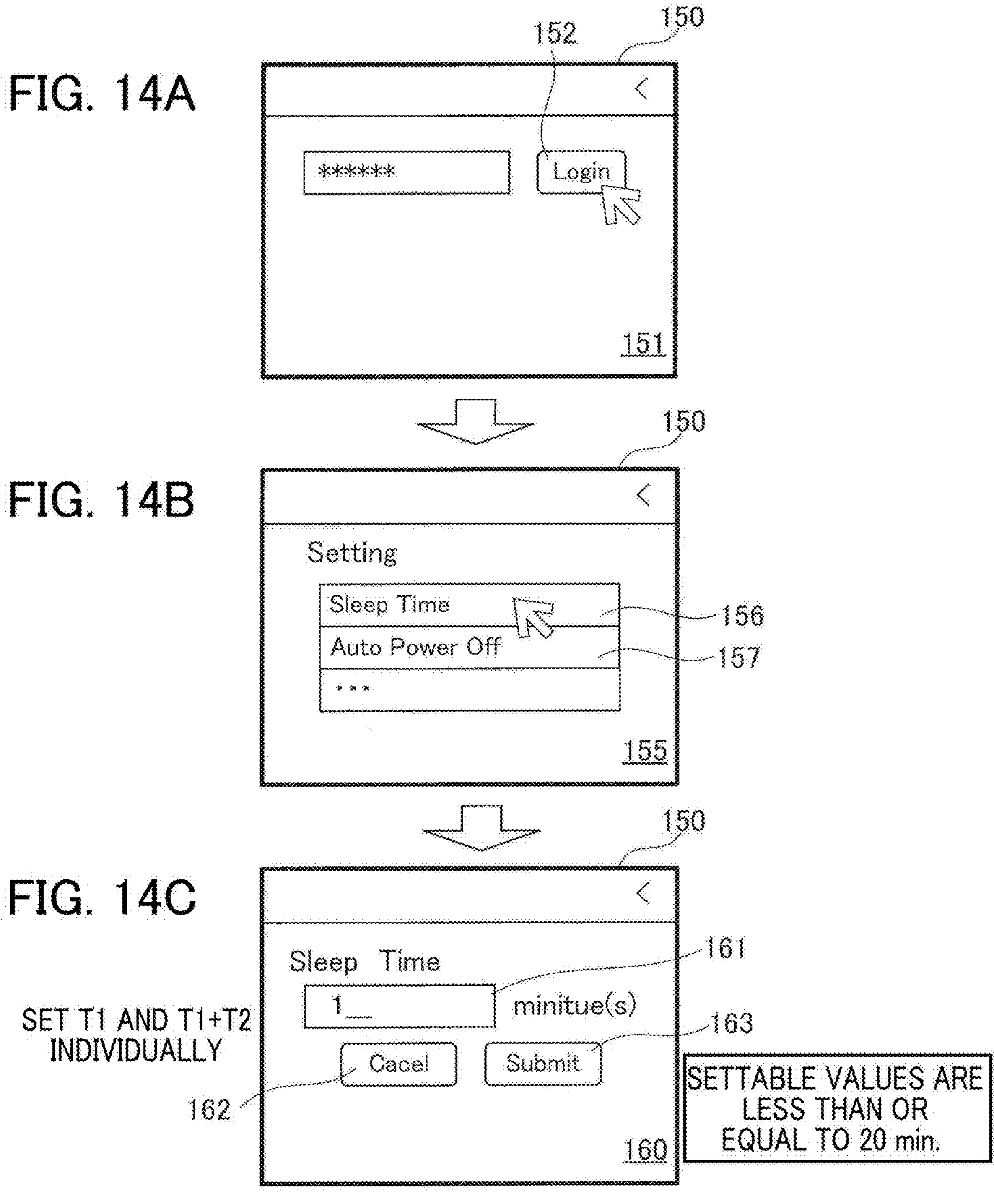
FIGS. 14A-14C are explanatory diagrams illustrating operations with the terminal for setting duration for transition to the sleep states.

In S81 at the beginning of the process in FIG. 13, the controller of the PC 50 determines whether the administrator is logged in on the MFP settings app and continues to wait while the administrator is not logged in on the MFP settings app (S81: NO). The PC 50 has the display 150 and, when the MFP settings app is started up on the PC 50, the controller of the PC 50 displays a login screen 151 on the display 150, as shown in FIG. 14A. The login screen 151 includes a field for inputting a login ID, and a Login key 152. The administrator can log in to the MFP settings app by inputting a preset login ID using a keyboard or the like and operating the Login key 152. Once the administrator has logged in successfully (S81: YES), the controller of the PC 50 displays a setting items screen 155 on the display 150, as shown in FIG. 14B. The setting items screen 155 includes a sleep setting icon 156 for setting the durations until the MFP 1 transitions to sleep states, and an off-mode setting icon 157 for setting the duration until the MFP 1 transitions to the off-mode state. When the user, as the administrator, performs an operation in the setting items screen 155 to select the sleep setting icon 156 in particular, in S82 the controller of the PC 50 displays a sleep setting screen 160 on the display 150, as shown in FIG. 14C.

The sleep setting screen 160 includes a display field 161 displaying numbers inputted on the keyboard and the like, a Cancel key 162, and a Submit key 163. Through a keyboard or other devices, the user can directly input a setting value (a time-length value) for the duration T1 until the MFP 1 transitions from the standby state to the panel sleep state, and a setting value (time-length value) for the duration T1+T2 until the MFP 1 transitions from the standby state to the deep sleep state. Here, the user may be allowed to input the time-length value for the duration T2 instead of the time-length value for the duration T1+T2. Alternatively, the duration T2 may be a fixed time (e.g., 30 minutes), and the user may only be allowed to input the setting value (time-length value) for the duration T1. In general, the user can input one of the one-minute increments between 1 and 20 minutes as the setting value for the duration T1 and one of the one-minute increments between 1 and 50 minutes as the setting value (time-length value) for the duration T1+T2. Any value greater than 20 minutes cannot be set as the time-length values for the duration T1 or the duration T1+T2, even when the user is allowed to input such a number, as will be described later. In the present embodiment, the user can only input a time-length value for the duration T1+T2 that is the same as or greater than the time-length value for the duration T1, but the MFP settings app may be configured to allow input of a time-length value for the duration T1+T2 smaller than the time-length value for the duration T1. In such a case, the MFP 1 will only transition from the standby state to the deep sleep state and will never transition to the panel sleep state.

In S83 the controller of the PC 50 determines whether the Submit key 163 has been operated in the sleep setting screen 160 and continues to wait while the Submit key 163 has not been operated (S83: NO). Once the Submit key 163 has been operated (S83: YES), in S84 the controller of the PC 50 determines, at the timing of the Submit key 163 being operated, whether valid setting values (valid time-length values) have been inputted by the user for the durations T1 and T1+T2. Specifically, a valid setting value (valid time-length) is a one-minute increment between 1 and 20 minutes for the duration T1 and a valid setting value (valid time-length value) is a one-minute increment between 1 and 50 minutes for the duration T1+T2, but these ranges can be modified as appropriate.

When the controller of the PC 50 determines, at the timing of the Submit key 163 being operated, that the user has inputted valid setting values (valid time-length value) for the durations T1 and T1+T2 through operations on the keyboard or the like (S84: YES), the controller of the PC 50 advances to S85. However, when the controller of the PC 50 determines that an invalid setting values (invalid time-length values) has been inputted for at least one of the durations T1 and T1+T2 (S84: NO), in S88 the controller of the PC 50 displays a warning to inform the user that the settings update failed, and subsequently ends the sleep transition time setting process.

In S85 the controller of the PC 50 determines whether the user-inputted time-length values are less than or equal to 20 minutes (an example of the reference value and the first reference value) for both T1 and T1+T2.

When the controller of the PC 50 determines that the user-inputted time-length values are no greater than 20 minutes for both the durations T1 and T1+T2 (S85: YES), in S86 the controller of the PC 50 makes the user-inputted time-length values effective as the new settings for the durations T1 and T1+T2 and transmits these new setting values to the MFP 1 via communication means (a LAN or the like) so that the MFP 1 can store the new setting values for the durations T1 and T1+T2 in the memory 34. Accordingly, the MFP 1 updates the durations T1 and T1+T2 based on the received new setting values. In S87 the controller of the PC 50 displays a message on the display 150 of the PC 50 indicating that the durations T1 and T1+T2 have been successfully updated.

On the other hand, when the controller of the PC 50 determines that the user-inputted time-length value is greater than 20 minutes for at least one of the T1 and T1+T2 (S85: NO), in S88 the controller of the PC 50 displays a warning notifying the user that the setting update failed, and subsequently ends the sleep transition time setting process. In other words, when setting the durations T1 and T1+T2 until the MFP 1 transitions to the panel sleep state and the deep sleep state in this embodiment, a time-length value greater (longer) than 20 minutes can only be set through the control panel 12 on the MFP 1 (i.e., based on user operations received through the user interface 38 of the MFP 1), while only time-length values less than or equal to 20 minutes can be set through operations on an external device connected to the MFP 1 (i.e., based on user operations received via the network interface 40).

Figure 15:
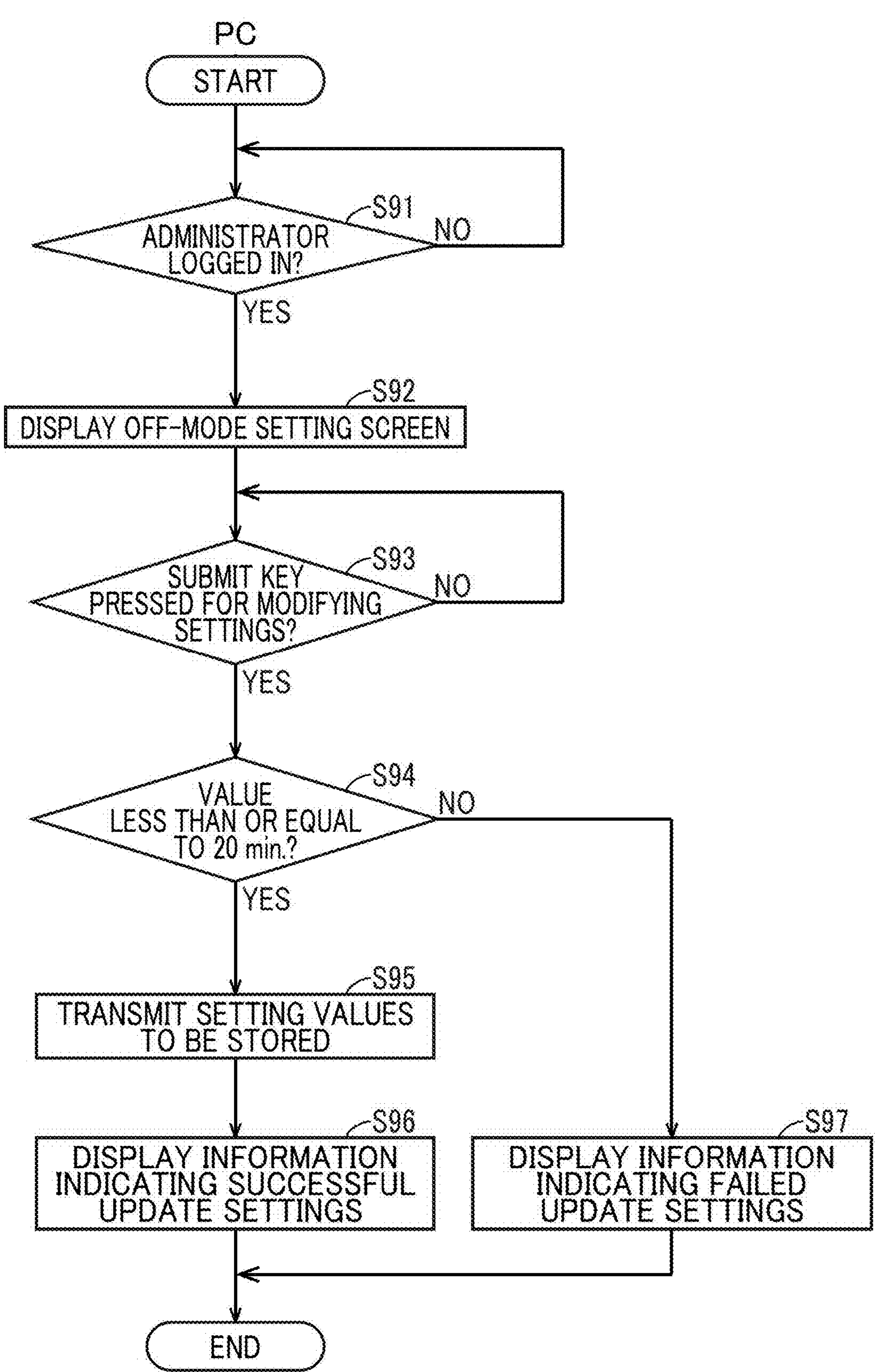
FIG. 15 is a flowchart illustrating an off-mode transition time setting process executed by the terminal.

Next, various control processes executed by the controller of the PC 50 as an external terminal, which is also connected to and capable of communicating with the MFP 1, and particularly a control process related to setting the duration until the MFP 1 transitions to the off-mode state, will be described with reference to FIG. 15. FIG. 15 is a flowchart showing steps in an off-mode transition time setting process performed on the PC 50. This process is executed after the MFP settings app pre-installed on the PC 50 is started. The controller of the PC 50 executes the following processes indicated in the flowchart of FIG. 15 based on a program stored in the memory of the PC 50. The MFP 1 and PC 50 may be connected by any manners or means through which data can be exchanged, such as a wireless LAN, wired LAN, or USB connection.

In S91 at the beginning of the process in FIG. 15, the controller of the PC 50 determines whether the administrator is logged in on the MFP settings app and continues to wait while the administrator is not logged in on the MFP settings app (S91: NO). Here, when the MFP settings app is started up on the PC 50, the controller of the PC 50 displays the login screen 151 on the display 150, as shown in FIG. 16A. A user can log in to the MFP settings app as an administrator by inputting a preset login ID using a keyboard or the like and operating the Login key 152. Once the administrator has logged in on the MFP settings app successfully (S91: YES), the controller of the PC 50 displays the setting items screen 155 on the display 150, as shown in FIG. 16B. The setting items screen 155 includes the sleep setting icon 156 for setting the duration until the MFP 1 transitions to the sleep states, and the off-mode setting icon 157 for setting the duration until the MFP 1 transitions to the off-mode state. When the user as the administrator performs an operation in the setting items screen 155 to select the off-mode setting icon 157 in particular, in S92 the controller of the PC 50 displays an off-mode setting screen 170 on the display 150, as shown in FIG. 16C.

The off-mode setting screen 170 displays various time-length values as selection options in a pull-down list 171. Through the pull-down list 171, the user can select a setting value (a time-length value) for the duration T3 for transitioning from the standby state to the off-mode state. Specifically, the administrator can select one of 20 minutes, 1 hour, 2 hours, 4 hours, 8 hours, and an OFF setting in which the MFP 1 does not transition to the off-mode state regardless of an elapsed duration, but time-length values greater (longer) than 20 minutes are grayed out and cannot be selected despite being presented as selection options (this sequence is based on the process S94 described later). The off-mode setting screen 170 also includes a Cancel key 172, and a Submit key 173.

In S93 the controller of the PC 50 determines whether the Submit key 173 has been operated in the off-mode setting screen 170 and continues to wait while the Submit key 173 has not been operated (S93: NO). Once the Submit key 173 has been operated (S93: YES), in S94 the controller of the PC 50 determines whether the user-selected setting value (user-selected time-length value) for the duration T3 in the pull-down list 171 at the time of the Submit key 173 being operated is less than or equal to 20 minutes (an example of the reference value and the second reference value). Note that T3=∞ in the OFF setting and, hence, is considered greater than 20 minutes.

When the controller of the PC 50 determines that the user-selected setting value (user-selected time-length value) for the duration T3 is 20 minutes or less (S94: YES), in S95 the controller of the PC 50 makes the user-selected time-length value as the new setting value for the duration T3 and transmits the new setting value (new time-length value) for the duration T3 to the MFP 1 via communication means (a LAN or the like) so that the MFP 1 can store the new setting value (new time-length value) for the duration T3 in the memory 34. Accordingly, the MFP 1 updates the duration T3 based on the received setting value (received time-length) for the duration T3. In the meantime, in S96 the controller of the PC 50 displays a message on the display 150 of the PC 50 indicating that the duration T3 has been successfully updated.

On the other hand, when the controller of the PC 50 determines that the user-selected setting value (user-selected time-length) for the duration T3 is greater than 20 minutes (S94: NO), in S97 the controller of the PC 50 displays a warning notifying the user that the setting update failed, and subsequently ends the off-mode transition time setting process. In other words, when setting the duration until the MFP 1 transitions to the off-mode state in this embodiment, a time length greater (longer) than 20 minutes can only be set through the control panel 12 on the MFP 1 (i.e., based on user operations received through the user interface 38 of the MFP 1), while only time lengths less (shorter) than or equal to 20 minutes can be set through operations on an external device connected to the MFP 1 (i.e., based on user operations received via the network interface 40).

Figure 17:
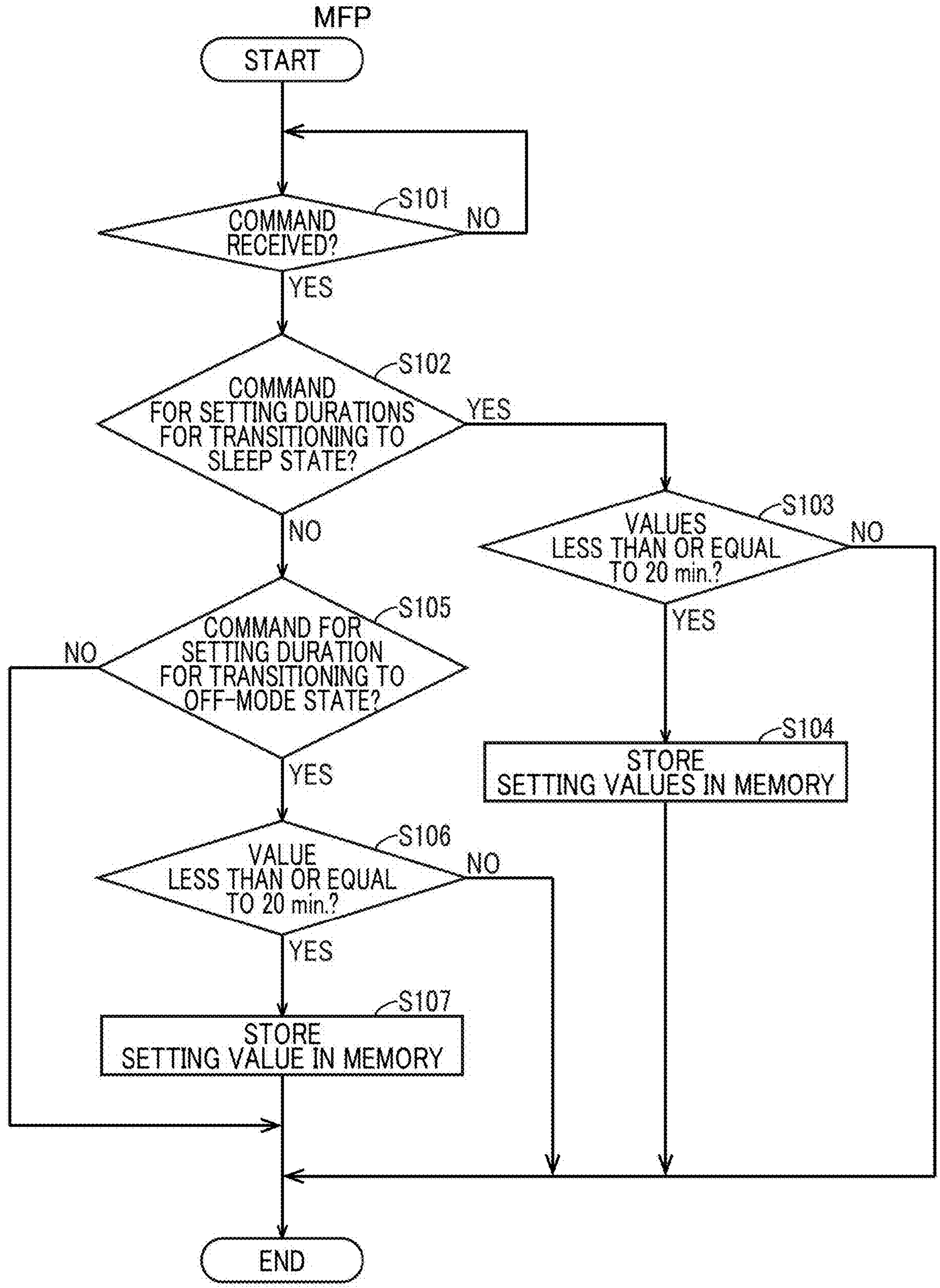
FIG. 17 is a flowchart illustrating a command reception process.

Next, various control processes executed by the controller of the MFP 1 (as described above, the term “controller” collectively refers to the controller 31 and power supply controller 33), and particularly a control process for setting the duration until the MFP 1 transitions to each of the panel sleep state, deep sleep state, and off-mode state based on printer job language (PJL) commands received from an external terminal (e.g., a PC) connected to and capable of communicating with the MFP 1, will be described with reference to FIG. 17. FIG. 17 is a flowchart illustrating steps in a command reception process performed on the MFP 1. The command reception process is executed while the MFP 1 is in any state other than the off-mode state. The controller executes the following various processes shown in the flowchart of FIG. 17 according to a program stored in the memory 34 of the MFP 1.

In S101 at the beginning of the process in FIG. 17, the controller determines whether a PJL command has been received from an external terminal (e.g., a PC) connected to and capable of communicating with the MFP 1. The MFP 1 and the external terminal may be connected by any means through which data can be exchanged, such as a wireless LAN, wired LAN, or USB connection.

When the controller determines that a PJL command has been received from an external terminal connected to the MFP 1 (S101: YES), the controller advances to S102. On the other hand, when the controller determines that a PJL command has not been received from an external terminal connected to the MFP 1 (S101: NO), the controller waits for a PJL command to be received.

In S102 the controller determines whether the PJL command received from the external terminal is a command to set durations until the MFP 1 transitions to the panel sleep state and the deep sleep state.

When the controller determines that the PJL command is a command for setting durations to transition to the panel sleep state and the deep sleep state (S102: YES), the controller advances to S103. Note that a PJL command for setting the durations for transitioning to the panel sleep state and the deep sleep state includes information specifying the setting value (time-length value) for the duration T1 until the MFP 1 enters the panel sleep state from the standby state, and the setting value (time-length value) for the duration T1+T2 until the MFP 1 enters the deep sleep state from the standby state.

In S103 the controller determines whether both the setting values (time-length values) for the durations T1 and T1+T2 specified in the PJL command are less than or equal to 20 minutes.

When the controller determines that both the setting values (time-length values) for the durations T1 and T1+T2 specified in the PJL command are less than or equal to 20 minutes (S103: YES), in S104 the controller makes the setting values (time-length values) specified in the PJL command effective as the new setting values (time-length values) for the durations T1 and T1+T2 and stores these setting values (time-length values) in the memory 34. That is, the setting values are updated for the durations T1 and T1+T2.

On the other hand, when the controller determines that at least one of the setting values (at lease one of time-length values) for the durations T1 and T1+T2 is greater than 20 minutes (S103: NO), the controller discards the PJL command and ends the command reception process. In other words, when setting the time-length values for the durations until the MFP 1 transitions to the panel sleep state and the deep sleep state in this embodiment, time lengths greater (longer) than 20 minutes can only be set through the control panel 12 of the MFP 1 (i.e., based on user operations received via the user interface 38 of the MFP 1), while only time length less (shorter) than or equal to 20 minutes can be set through operations on an external device connected to the MFP 1 (i.e., based on user operations received via the network interface 40).

On the other hand, when the controller determines that the PJL command received from the external terminal is not a command for setting durations to transition to the panel sleep state and deep sleep state (S102: NO), in S105 the controller determines whether the PJL command received from the external terminal is a command for setting the time-length value for the duration until the MFP 1 transitions to the off-mode state.

When the controller determines that the PJL command is a command for setting the duration until the MFP 1 transitions to the off-mode state (S105: YES), the controller advances to S106. Note that a PJL command for setting the time-length values for the duration until the MFP 1 transitions to the off-mode state includes information specifying a setting value (time-length value) for the duration T3 until the MFP 1 transitions to the off-mode state from the standby state.

On the other hand, when the controller determines that the PJL command received from the external terminal is not a command for setting the duration until the MFP 1 transitions to the off-mode state (S105: NO), the controller executes another process corresponding to the content of the received PJL command and subsequently ends the command reception process.

In S106 the controller determines whether the setting value (time-length value) for the duration T3 specified in the received PJL command is less than or equal to 20 minutes.

When the controller determines that the setting value (time-length value) for the duration T3 specified in the PJL command is less than or equal to 20 minutes (S106: YES), in S107 the controller makes the setting value (time-length value) specified in the PJL command effective as the new setting value (time-length value) for the duration T3 and stores this setting value (time-length value) in the memory 34. That is, the setting value (time-length value) for the duration T3 is updated.

However, when the controller determines that the setting value (time-length value) for the duration T3 specified in the PJL command is greater than 20 minutes (S106: NO), the controller discards the PJL command and ends the command reception process. In other words, when setting a time-length value for the duration until the MFP 1 transitions to the off-mode state, the time-length value greater (longer) than 20 minutes can only be set through the control panel 12 on the MFP 1 (i.e., based on user operations received via the user interface 38 of the MFP 1), while only times less than or equal to 20 minutes can be set through operations on an external device connected to the MFP 1 (i.e., based on user operations received via the network interface 40).

As described above in detail, the MFP 1 of the present embodiment is transitioned to the sleep state in which the MFP 1 consumes less power than in the standby state (S6, S9), under the condition including a requirement that the standby state continues for the durations T1 or more or a requirement that the standby state continues for the duration T1+T2 or more, and is transitioned to the off-mode state (S14) in which the MFP 1 consumes even less power than in the sleep state, under the condition including a requirement the time duration T3 or more elapses after the MFP 1 transitions to the standby state. However, since the durations T1, T1+T2, and T3 can each be set individually based on user operations received via the user interface 38 (S61-S69, S71-S78, S81-S88, S91-S97, S101-S107), the duration for transitioning to the off-mode state after entering the standby state can be set more easily than in the conventional method, enabling the MFP 1 to have state transitions in line with the user's intentions.

The MFP 1 is further provided with the image-forming member 35 that performs image formation based on user operations received via the user interface 38 or instruction data received through the network interface 40. The standby state is a state in which the main power supply is on, a state prior to transitioning to both the sleep state and the off-mode state, and a state in which the MFP 1 has not received instruction data via the network interface 40, has not received a user operation via the user interface 38, and has not executed image formation with the image-forming member 35. Therefore, when the main power is turned on but there is a prolonged duration in which no commands are issued to execute image formation and no data related to image formation is received, the MFP 1 can be transitioned to the sleep state or the off-mode state in order to reduce power consumption.

Further, time ranges in which the durations T1, T1+T2, and T3 can be set are defined, and the lower limit of time-length value that can be set for the duration T3 is less (shorter) than the upper limits of time-length values that can be set for the durations T1 and T1+T2. Therefore, the MFP 1 can be set to transition directly to the off-mode state from the standby state without entering a sleep state in order to further reduce power consumption.

The sleep state includes a panel sleep state that suppresses power consumption by at least halting the power supply to the display, and a deep sleep state that further suppresses power consumption by increasing one or more components to which power supply are halted compared to the panel sleep state. When entering the sleep state, the MFP 1 is first transitioned to the panel sleep state (S6) and is subsequently transitioned to the deep sleep state (S9) after the duration T2 has elapsed without a condition for canceling the panel sleep state being met. By gradually transitioning the sleep state over time to states in which the MFP 1 consume less power, the MFP 1 can further reduce power consumption.

When a time-length value greater (longer) than the first reference value (e.g., 20 minutes) is set as one of the durations T1 and T1+T2, the MFP 1 issues a warning in S67 (FIG. 9) to the user who set the time-length values of the durations T1 and T1+T2. Thus, the MFP 1 can encourage the user to be conscious of conserving power when using the device.

The durations T1 and T1+T2 can be set to time-length values greater (longer) than the first reference value when set based on user operations received via the user interface 38 but must be less than or equal to the first reference value when set based on user operations received via the network interface 40. Accordingly, the user is encouraged to set the duration T1 and T1+T2 to setting values (time-length values) less (shorter) than the first reference value but may set them to setting values (time-length values) greater (longer) than the first reference value when the user strongly desires to do so.

When the duration T3 is set to a time-length value greater (longer) than the second reference value (e.g., 20 minutes), the MFP 1 warns the user (S76 of FIG. 11) who set the duration T3 and encourages the user to consider conserving power when using the device.

The duration T3 can be set to a time-length value greater (longer) than the second reference value based on user operations received via the user interface 38 but can only be set to a time-length value less (shorter) than or equal to the second reference value based on user operations received via the network interface 40. Accordingly, the MFP 1 can encourage the user to set the duration T3 to a time-length value less (shorter) than or equal to the second reference value while allowing the user to set the duration T3 to a time-length value greater (longer) than the second reference value when the user strongly desires to do so.

Different conditions are set for canceling the sleep state and for canceling the off-mode state. As the condition for canceling the off-mode state, the power switch 22 provided on the MFP 1 must be operated. This condition can prevent the off-mode state from being easily canceled, thereby further reducing power consumption.

The MFP 1 may transition to the sleep state but not the off-mode state while a connection is established between the MFP 1 and an external device. This can prevent a situation in which the MFP 1 is transitioned to the off-mode state and becomes incapable of communicating with an external device while in a state communicating with or attempting to communicate with the external device, for example.

As described above, in the MFP 1 that is an example of the image forming device, the controller transitions the image forming device (MFP 1) to a sleep state from a standby state under a condition that a duration T1 elapses with the image forming device maintained (MFP 1) in the standby state since a start of the standby state (S6). The sleep state is a state in which the image forming device (MFP 1) consumes less power than in the standby state. The controller transitions the image forming device (MFP 1) to an off-mode state from the standby state under a condition that a duration T3 elapses with the image forming device (MFP 1) maintained in the standby state since the start of the standby state (S13: YES, S14). The off-mode state is a state in which the image forming device consumes less power than in the sleep state. The controller individually setting the duration T1 and the duration T3 by storing the duration T1 and the duration T3 in the memory 34 (S66 of FIG. 9, S75 of FIGS. 11, S104 and S107 of FIG. 17). Each of the duration T1 and the duration T3 is inputted via the user interface or the communication interface.

The standby state is a state: where main power of the image forming device (MFP 1) is on; where the image forming device (MFP 1) has received neither an image-formation instruction operation via the user interface nor image-formation instruction data via the communication interface; and where no image formation is in progress in the image forming device (MFP 1).

A time-length value settable for the duration T1 falls within a first range, and a time-length value settable for the duration T2 falls within a second range. A lower limit of the second range is less than the upper limit of the first range.

The user interface 38 includes the display 21 configured to display information. The sleep state is a panel sleep state in which the image forming device (MFP 1) consumes less power than in the standby state by halting a power supply to the display 21. The controller transitions the image forming device (MFP 1) to a deep sleep state from the panel sleep state under a condition that a preset duration (T2) elapses with the image forming device (MFP 1) maintained in the panel sleep state since a start of the panel sleep state without satisfying a condition for cancelling the panel sleep state (S8: YES, S9). The deep sleep state is a state in which the image forming device (MFP 1) consumes less power than in the panel sleep state by halting a power supply to a component in the image forming device (MFP 1) in addition to halting the power supply to the display.

The controller issues a warning when a time-length value inputted for the duration T1 is greater than a reference value (S65: NO, S67).

In a case where a time-length value is inputted for the duration T1 via the user interface 38 (S65: NO), the individually setting sets the inputted time-length value as the duration T1 even when the inputted time-length value is greater than a reference value (S65: YES, S66). In a case where a time-length value is inputted for the duration T1 via the communication interface, the individually setting sets the inputted time-length value as the duration T1 only when the inputted time-length value is less than the reference value (S103: YES, S104).

The controller issues a warning when a time-length value inputted for the duration T3 is greater than a reference value (S74: NO, S76).

In a case where a time-length value is inputted for the duration T3 via the user interface, the individually setting sets the inputted time-length value as the duration T3 even when the inputted time-length value is greater than a reference value (S74: YES, S75). In a case where a time-length value is inputted for the duration T3 via the communication interface, the individually setting sets the inputted time-length value as the duration T3 only when the inputted time-length value is less than the reference value (S106: YES, S107).

The image forming device (MFP 1) includes a power key (power switch 22). The controller cancels the sleep state when a condition for cancelling the sleep state is satisfied (S7: YES, S10: YES, S1). The controller cancels the off-mode state when a condition for cancelling the off-mode state is satisfied, the condition for cancelling the off-mode state being different from the condition for cancelling the sleep state (S42: YES, S43). The condition for cancelling the off-mode state is that the power key is operated.

The controller performs the transitioning the image forming device (MFP 1) to the sleep state from the standby state even when the image forming device (MFP 1) has established communications with an external device (S5: YES, S8: YES). The controller does not perform the transitioning the image forming device (MFP 1) to the off-mode state from the standby state when the image forming device (MFP 1) has established communications with the external device (S13: NO).

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

While the panel sleep state and the deep sleep state serve as sub-states of the sleep state in the above embodiment, the MFP 1 may be configured to use only one of these sleep states. Another feature is that the liquid crystal display of the user interface 38 is turned off in the panel sleep state, but components other than the liquid crystal display may also be turned off.

In the above embodiment, the time range of time-length values to which the duration T1 can be set is 1-20 minutes, the time range within which time-length values for the duration T1+T2 can be set is 1-50 minutes, and the time range within which a time-length value for the duration T3 can be set is between 20 minutes and 8 hours. However, each of these time ranges can be modified as appropriate, provided that the lower limit of time-length value that can be set as the duration T3 is or less (shorter) than or equal to the upper limits of time-length values that can be set as the durations T1 and T1+T2. In a stricter case, the lower limit of time-length value that can be set as the duration T3 is less (shorter) than the upper limits of time-length values that can be set as the durations T1 and T1+T2.

In the embodiment, an example of the image forming device is provided using the multifunction peripheral 1 having the fax function, the copy function, and the scanner function in addition to the print function. However, the image forming device is not limited to the multifunction peripheral 1 but may be any device having the print function such as a printer having the print function only.

What is claimed is:

1. An image forming device comprising:
a user interface;
a communication interface;
a memory; and
a controller configured to perform:
transitioning the image forming device to a sleep state from a standby state under a condition that a first duration elapses with the image forming device maintained in the standby state since a start of the standby state, the sleep state being a state in which the image forming device consumes less power than in the standby state;
transitioning the image forming device to an off-mode state from the standby state under a condition that a second duration elapses with the image forming device maintained in the standby state since the start of the standby state, the off-mode state being a state in which the image forming device consumes less power than in the sleep state; and
individually setting the first duration and the second duration by storing the first duration and the second duration in the memory, each of the first duration and the second duration being inputted via the user interface or the communication interface,
wherein in a case where a time-length value is inputted for the first duration via the user interface, the individually setting sets the inputted time-length value as the first duration even when the inputted time-length value is greater than a first reference value, and
wherein in a case where a time-length value is inputted for the first duration via the communication interface, the individually setting sets the inputted time-length value as the first duration only when the inputted time-length value is less than the first reference value.

2. The image forming device according to claim 1, wherein the standby state is a state:
where main power of the image forming device is on;
where the image forming device has received neither an image-formation instruction operation via the user interface nor image-formation instruction data via the communication interface; and
where no image formation is in progress in the image forming device.

3. The image forming device according to claim 1, wherein a time-length value settable for the first duration falls within a first range, and a time-length value settable for the second duration falls within a second range, and
wherein a lower limit of the second range is less than an upper limit of the first range.

4. The image forming device according to claim 1, wherein the user interface includes a display configured to display information,
wherein the sleep state is a panel sleep state in which the image forming device consumes less power than in the standby state by halting a power supply to the display,
wherein the controller is configured to further perform:
transitioning the image forming device to a deep sleep state from the panel sleep state under a condition that a preset duration elapses with the image forming device maintained in the panel sleep state since a start of the panel sleep state without satisfying a condition for cancelling the panel sleep state, and
wherein the deep sleep state is a state in which the image forming device consumes less power than in the panel sleep state by halting a power supply to a component in the image forming device in addition to halting the power supply to the display.

5. The image forming device according to claim 1, wherein the controller is configured to further perform:
issuing a warning when the time-length value inputted for the first duration via the user interface is greater than the first reference value.

6. The image forming device according to claim 1, wherein the controller is configured to further perform:
issuing a warning when a time-length value inputted for the second duration is greater than a second reference value.

7. The image forming device according to claim 1, wherein in a case where a time-length value is inputted for the second duration via the user interface, the individually setting sets the inputted time-length value as the second duration even when the inputted time-length value is greater than a second reference value, and
wherein in a case where a time-length value is inputted for the second duration via the communication interface, the individually setting sets the inputted time-length value as the second duration only when the inputted time-length value is less than the second reference value.

8. The image forming device according to claim 1, further comprising:
a power key,
wherein the controller is configured to further perform:
cancelling the sleep state when a condition for cancelling the sleep state is satisfied; and
cancelling the off-mode state when a condition for cancelling the off-mode state is satisfied, the condition for cancelling the off-mode state being different from the condition for cancelling the sleep state, and
wherein the condition for cancelling the off-mode state is that the power key is operated.

9. An image forming device comprising:

a user interface;

a communication interface;

a memory; and a controller configured to perform:

transitioning the image forming device to a sleep state from a standby state under a condition that a first duration elapses with the image forming device maintained in the standby state since a start of the standby state, the sleep state being a state in which the image forming device consumes less power than in the standby state;

transitioning the image forming device to an off-mode state from the standby state under a condition that a second duration elapses with the image forming device maintained in the standby state since the start of the standby state, the off-mode state being a state in which the image forming device consumes less power than in the sleep state; and individually setting the first duration and the second duration by storing the first duration and the second duration in the memory, each of the first duration and the second duration being inputted via the user interface or the communication interface, wherein the controller performs the transitioning the image forming device to the sleep state from the standby state even when the image forming device has established communications with an external device, and wherein the controller does not perform the transitioning the image forming device to the off-mode state from the standby state when the image forming device has established communications with the external device.

10. An image forming device comprising:

a user interface;

a communication interface;

a memory; and a controller configured to perform:

transitioning the image forming device to a sleep state from a standby state under a condition that a first duration elapses with the image forming device maintained in the standby state since a start of the standby state, the sleep state being a state in which the image forming device consumes less power than in the standby state;

transitioning the image forming device to an off-mode state from the standby state under a condition that a second duration elapses with the image forming device maintained in the standby state since the start of the standby state, the off-mode state being a state in which the image forming device consumes less power than in the sleep state; and individually setting the first duration and the second duration by storing the first duration and the second duration in the memory, each of the first duration and the second duration being inputted via the user interface or the communication interface, wherein in a case where a time-length value is inputted for the second duration via the user interface, the individually setting sets the inputted time-length value as the second duration even when the inputted time-length value is greater than a first reference value, and wherein in a case where a time-length value is inputted for the second duration via the communication interface, the individually setting sets the inputted time-length value as the second duration only when the inputted time-length value is less than the first reference value.

11. The image forming device according to claim 10, wherein the standby state is a state:

where main power of the image forming device is on;

where the image forming device has received neither an image-formation instruction operation via the user interface nor image-formation instruction data via the communication interface; and where no image formation is in progress in the image forming device.

12. The image forming device according to claim 10, wherein a time-length value settable for the first duration falls within a first range, and a time-length value settable for the second duration falls within a second range, and wherein a lower limit of the second range is less than an upper limit of the first range.

13. The image forming device according to claim 10, wherein the user interface includes a display configured to display information, wherein the sleep state is a panel sleep state in which the image forming device consumes less power than in the standby state by halting a power supply to the display, wherein the controller is configured to further perform:

transitioning the image forming device to a deep sleep state from the panel sleep state under a condition that a preset duration elapses with the image forming device maintained in the panel sleep state since a start of the panel sleep state without satisfying a condition for cancelling the panel sleep state, and wherein the deep sleep state is a state in which the image forming device consumes less power than in the panel sleep state by halting a power supply to a component in the image forming device in addition to halting the power supply to the display.

14. The image forming device according to claim 10, wherein the controller is configured to further perform:

issuing a warning when a time-length value inputted for the first duration is greater than a second reference value.

15. The image forming device according to claim 10, wherein the controller is configured to further perform:

issuing a warning when the time-length value inputted for the second duration via the user interface is greater than the first reference value.

16. The image forming device according to claim 10, further comprising:

a power key, wherein the controller is configured to further perform:

cancelling the sleep state when a condition for cancelling the sleep state is satisfied; and cancelling the off-mode state when a condition for cancelling the off-mode state is satisfied, the condition for cancelling the off-mode state being different from the condition for cancelling the sleep state, and wherein the condition for cancelling the off-mode state is that the power key is operated.

* * * * *